United States Patent
Morrow et al.

(10) Patent No.: US 9,494,953 B2
(45) Date of Patent: Nov. 15, 2016

(54) CONTROL SYSTEM AND METHOD FOR MULTI-STAGE HEATING AND COOLING SYSTEM WITH MINIMUM ON TIME AND OFF TIME

(71) Applicant: Emerson Climate Technologies Retail Solutions, Inc., Kennesaw, GA (US)

(72) Inventors: Dennis R. Morrow, Alpharetta, GA (US);
(Continued)

(73) Assignee: Emerson Climate Technologies Retail Solutions, Inc., Kennesaw, GA (US)

( * ) Notice: Subject to any disclaimer, the term of this patent is extended or adjusted under 35 U.S.C. 154(b) by 632 days.

(21) Appl. No.: 13/852,465

(22) Filed: Mar. 28, 2013

(65) Prior Publication Data
US 2013/0261809 A1    Oct. 3, 2013

Related U.S. Application Data

(60) Provisional application No. 61/617,887, filed on Mar. 30, 2012.

(51) Int. Cl.
| | |
|---|---|
| G05D 23/19 | (2006.01) |
| F24F 11/00 | (2006.01) |
| F24F 11/06 | (2006.01) |

(52) U.S. Cl.
CPC ......... *G05D 23/1917* (2013.01); *F24F 11/006* (2013.01); *F24F 11/0009* (2013.01);
(Continued)

(58) Field of Classification Search
None
See application file for complete search history.

(56) References Cited

U.S. PATENT DOCUMENTS

| | | | |
|---|---|---|---|
| 4,128,854 A | | 12/1978 | Ruminsky |
| 4,228,511 A | * | 10/1980 | Simcoe .............. G05D 23/1905 165/257 |

(Continued)

FOREIGN PATENT DOCUMENTS

| | | |
|---|---|---|
| KR | 100275557 B1 | 12/2000 |
| KR | 2006006580 A | 6/2006 |

(Continued)

OTHER PUBLICATIONS

Written Opinion of the International Searching Authority regarding Application No. PCT/US2013/034620, mailed Jul. 9, 2013.

(Continued)

*Primary Examiner* — Mohammad Ali
*Assistant Examiner* — Bernard G Lindsay
(74) *Attorney, Agent, or Firm* — Harness, Dickey & Pierce, P.L.C.

(57) ABSTRACT

A system and method are provided for activating and deactivating heating or cooling stages of a heating, ventilating, and air conditioning (HVAC) unit, which includes activating a heating or cooling stage of the HVAC unit based on a determined need for heating or cooling. A monitored temperature is compared with a first temperature setpoint and a monitored on-time of the heating or cooling stage is compared with a first time period setpoint. The heating or cooling stage is deactivated based on the comparison of the monitored temperature with the first temperature setpoint, when the monitored on-time is greater than the first time period setpoint. The monitored temperature is then compared with a second temperature setpoint. The heating or cooling stage is reactivated based on a comparison of the monitored temperature with the second temperature setpoint, when a monitored off-time is greater than the second time period setpoint.

32 Claims, 13 Drawing Sheets

Figure 1:
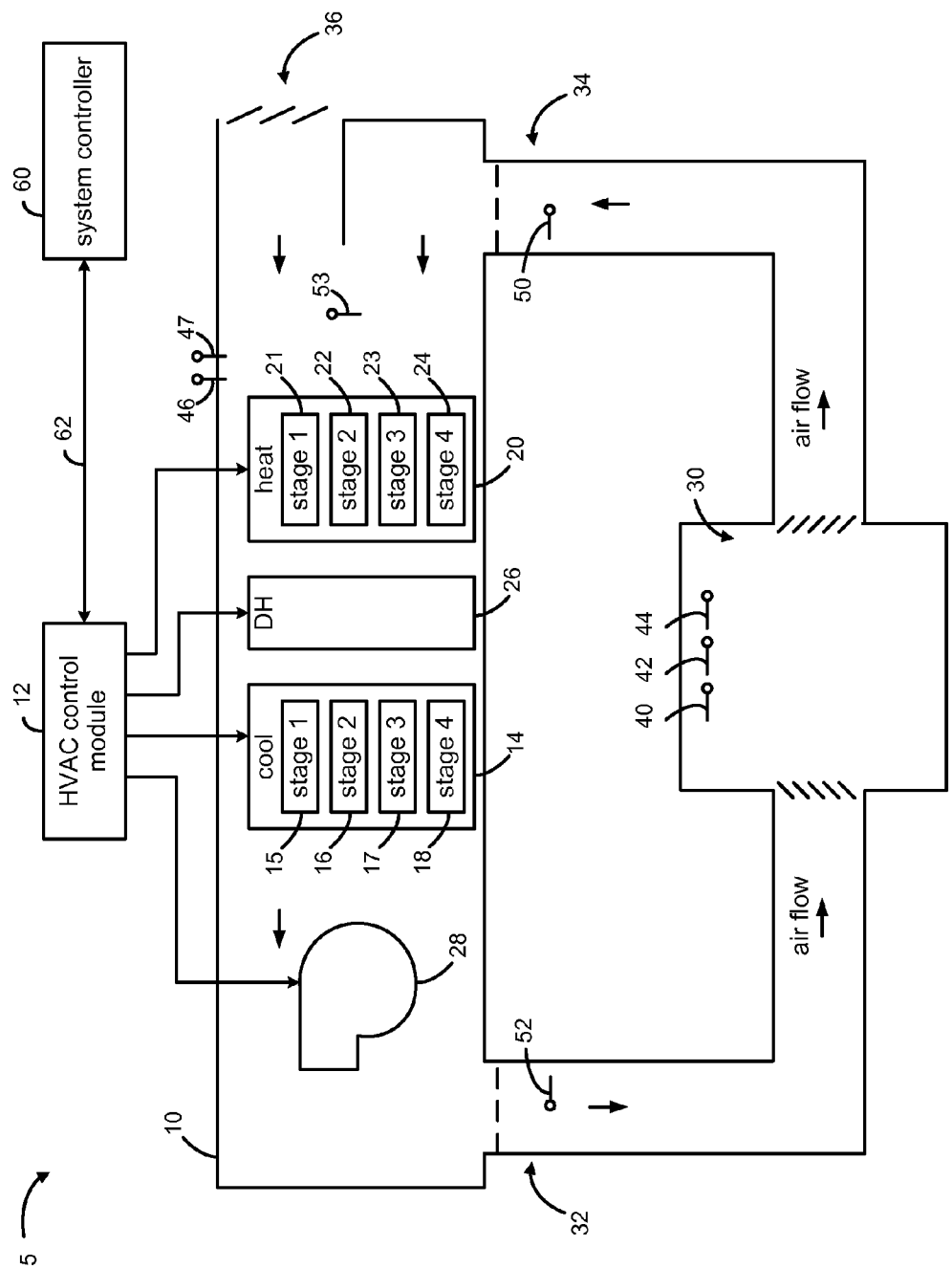

(72) Inventors: Timothy D. Campbell, Rockmart, GA (US); Samuel Smith, Kennesaw, GA (US); John Wallace, Acworth, GA (US)

(52) U.S. Cl.
CPC ............ *F24F 11/0012* (2013.01); *F24F 11/06* (2013.01); *G05D 23/1951* (2013.01); *F24F 2011/0063* (2013.01); *F24F 2011/0064* (2013.01)

(56) References Cited

U.S. PATENT DOCUMENTS

| | | | |
|---|---|---|---|
| 4,292,813 | A | 10/1981 | Paddock |
| 4,627,245 | A * | 12/1986 | Levine .................. F25D 21/006 62/157 |
| 5,271,556 | A | 12/1993 | Helt et al. |
| 5,426,620 | A | 6/1995 | Budney |
| 5,687,139 | A | 11/1997 | Budney |
| 6,062,482 | A | 5/2000 | Gauthier et al. |
| 6,176,436 | B1 | 1/2001 | Gauthier et al. |
| 6,474,084 | B2 | 11/2002 | Gauthier et al. |
| 6,637,667 | B2 | 10/2003 | Gauthier et al. |
| 6,705,097 | B2 | 3/2004 | So et al. |
| 6,986,469 | B2 | 1/2006 | Gauthier et al. |
| 7,644,869 | B2 | 1/2010 | Hoglund et al. |
| 2002/0166659 | A1 | 11/2002 | Wagner et al. |
| 2011/0056673 | A1 | 3/2011 | Jang et al. |
| 2011/0238224 | A1 | 9/2011 | Schnell et al. |
| 2013/0220589 | A1 * | 8/2013 | Liu ....................... F25B 29/003 165/253 |

FOREIGN PATENT DOCUMENTS

| | | |
|---|---|---|
| WO | 96/35979 A1 | 11/1996 |
| WO | 2011/062942 A1 | 5/2011 |

OTHER PUBLICATIONS

International Search Report regarding Application No. PCT/US2013/034620, mailed Jul. 9, 2013.
"Building Environmental Control (BEC) Installation and Operation Manual," Computer Process Controls, 026-1103 Rev 1, Jan. 5, 1998.
"E2 Instllation and Operation Manual for RX Refrigeration, BX HVAC, and CX Convenience Store Controllers," Emerson Climate Technologies, 026-1610 Rev 13, Sep. 14, 2011.
"MultiFlex RCB Rooftop Controller Installation and Operation Manual," Emerson Climate Technologies, 026-1707 Rev 2, Apr. 13, 2010.
"PaceController(TM) Energy-Saving Controllers For HVAC and Refrigeration," Model PACE2, Installation, Operation & Maintenance Manual, PaceControls, rev. 04c Oct. 6, 2006.
"UltraSite 32 User's Guide,", Computer Process Controls, 026-1002 Rev 3, Sep. 28, 1999.
"UltraSite User's Guide RMCC Supplement," Computer Process Controls, 026-1005 Rev 1, Jun. 9, 1997.
"UltraSite User's Guide BCU Supplement," Computer Process Controls, 026-1004 Rev 1, Sep. 4, 1997.
"UltraSite User's Guide BEC Supplement," Computer Process Controls, 026-1003 Rev 1, Oct. 6, 1997.
Office Action regarding Canadian Patent Application No. 2,868,282, dated Nov. 9, 2015.
Search Report regarding European Patent Application No. 13770255.1, dated May 20, 2016.

* cited by examiner

US 9,494,953 B2

CONTROL SYSTEM AND METHOD FOR MULTI-STAGE HEATING AND COOLING SYSTEM WITH MINIMUM ON TIME AND OFF TIME

CROSS-REFERENCE TO RELATED APPLICATIONS

This application claims the benefit of U.S. Provisional Application No. 61/617,887, filed on Mar. 30, 2012. The entire disclosure of the above application is incorporated herein by reference.

FIELD

The present disclosure relates to an HVAC control system and method and, more specifically, to an HVAC control system and method for controlling activation and deactivation of heating and cooling stages of an HVAC system.

BACKGROUND

This section provides background information related to the present disclosure which is not necessarily prior art.

Heating, ventilating, and air conditioning (HVAC) systems may generally include an HVAC unit with a heating unit having multiple heating stages and a cooling unit having multiple cooling stages. For example, an HVAC system may include a rooftop unit with multiple heating and cooling stages and an HVAC control module that activates and deactivates the various heating and cooling stages to provide heating or cooling to an interior space. An HVAC control module may monitor a temperature of an interior space of a building and activate or deactivate heating or cooling stages of the HVAC system based on the monitored temperature. Operation of heating or cooling stages, however, results in additional energy consumption and energy consumption costs.

SUMMARY

This section provides a general summary of the disclosure, and is not a comprehensive disclosure of its full scope or all of its features.

A method is provided and includes determining, with an HVAC control module of an HVAC unit, a need for cooling of a space to be cooled and activating, with the HVAC control module, a first cooling stage of the HVAC unit based on the determined need for cooling. The method further includes monitoring, with the HVAC control module, a temperature of the HVAC unit and an on-time of the first cooling stage, the on-time being a time elapsed since activation of the first cooling stage. The method further includes comparing, with the HVAC control module, the monitored temperature with a first temperature setpoint and the monitored on-time with a first time period setpoint. The method further includes deactivating, with the HVAC control module, the first cooling stage when the monitored temperature is less than the first temperature setpoint and the monitored on-time is greater than the first time period setpoint. The method further includes monitoring, with the HVAC control module, an off-time of the first cooling stage, the off-time being a time elapsed since deactivation of the first cooling stage. The method further includes comparing, with the HVAC control module, the monitored temperature with a second temperature setpoint, the second temperature setpoint being greater than the first temperature setpoint. The method further includes comparing, with the HVAC control module, the monitored off-time with a second time period setpoint. The method further includes reactivating, with the HVAC control module, the first cooling stage when the monitored temperature is greater than the second temperature setpoint and the monitored off-time is greater than the second time period setpoint.

Another method is provided and includes determining, with an HVAC control module of an HVAC unit, a need for heating of a space to be heated and activating, with the HVAC control module, a first heating stage of the HVAC unit based on the determined need for heating. The method further includes monitoring, with the HVAC control module, a temperature of the HVAC unit and an on-time of the first heating stage, the on-time being a time elapsed since activation of the first heating stage. The method further includes comparing, with the HVAC control module, the monitored temperature with a first temperature setpoint and the monitored on-time with a first time period setpoint. The method further includes deactivating, with the HVAC control module, the first heating stage when the monitored temperature is greater than the first temperature setpoint and the monitored on-time is greater than the first time period setpoint. The method further includes monitoring, with the HVAC control module, an off-time of the first heating stage, the off-time being a time elapsed since deactivation of the first heating stage. The method further includes comparing, with the HVAC control module, the monitored temperature with a second temperature setpoint, the second temperature setpoint being less than the first temperature setpoint. The method further includes comparing, with the HVAC control module, the monitored off-time with a second time period setpoint. The method further includes reactivating, with the HVAC control module, the first heating stage when the monitored temperature is less than the second temperature setpoint and the monitored off-time is greater than the second time period setpoint.

A system is provided and includes a controller for an HVAC unit having a first cooling stage. The controller includes a processor and a computer readable storage medium. The computer readable storage medium stores instructions, executable by the processor, for: determining a need for cooling of a space to be cooled; activating a first cooling stage of the HVAC unit based on the determined need for cooling; monitoring a temperature of the HVAC unit and an on-time of the first cooling stage, the on-time being a time elapsed since activation of the first cooling stage; comparing the monitored temperature with a first temperature setpoint and the monitored on-time with a first time period setpoint; deactivating the first cooling stage when the monitored temperature is less than the first temperature setpoint and the monitored on-time is greater than the first time period setpoint; monitoring an off-time of the first cooling stage, the off-time being a time elapsed since deactivation of the first cooling stage; comparing the monitored temperature with a second temperature setpoint, the second temperature setpoint being greater than the first temperature setpoint; comparing the monitored off-time with a second time period setpoint; and reactivating the first cooling stage when the monitored temperature is greater than the second temperature setpoint and the monitored off-time is greater than the second time period setpoint.

Another system is provided and includes a controller for an HVAC unit having a first heating stage. The controller includes a processor and a computer readable storage medium. The computer readable storage medium stores instructions, executable by the processor, for: determining a need for heating a space to be heated; activating a first heating stage of the HVAC unit based on the determined need for heating; monitoring a temperature of the HVAC unit and an on-time of the first heating stage, the on-time being a time elapsed since activation of the first heating stage; comparing the monitored temperature with a first temperature setpoint and the monitored on-time with a first time period setpoint; deactivating the first heating stage when the monitored temperature is greater than the first temperature setpoint and the monitored on-time is greater than the first time period setpoint; monitoring an off-time of the first heating stage, the off-time being a time elapsed since deactivation of the first heating stage; comparing the monitored temperature with a second temperature setpoint, the second temperature setpoint being less than the first temperature setpoint; comparing the monitored off-time with a second time period setpoint; and reactivating the first heating stage when the monitored temperature is less than the second temperature setpoint and the monitored off-time is greater than the second time period setpoint.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
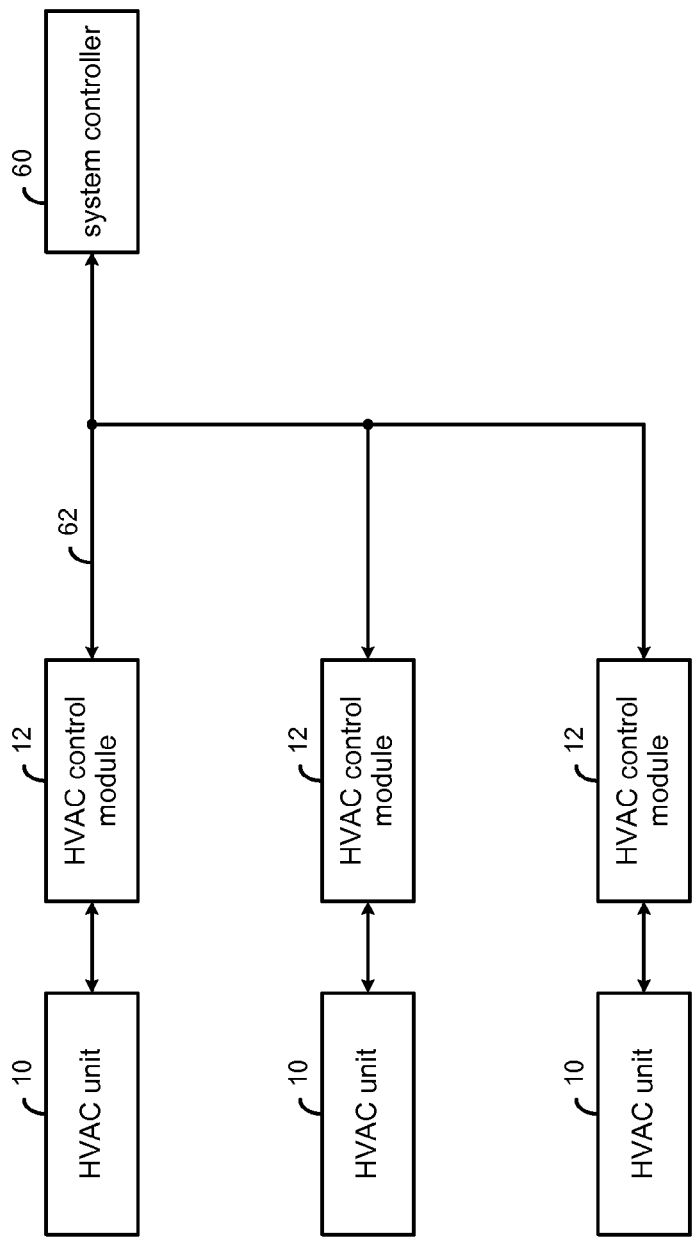
Figure 3:
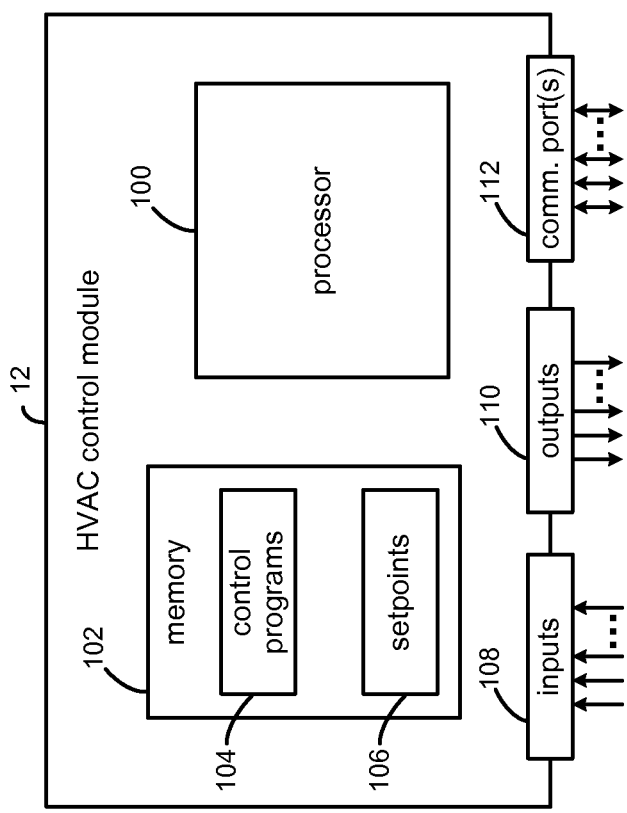
Figure 4:
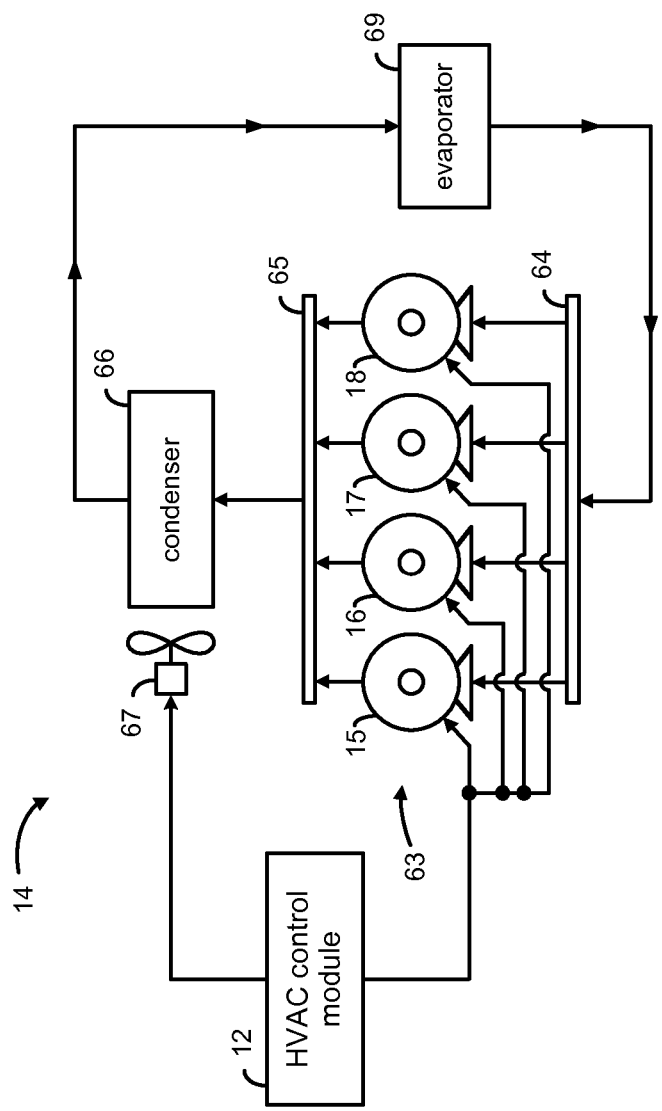
Figure 5:
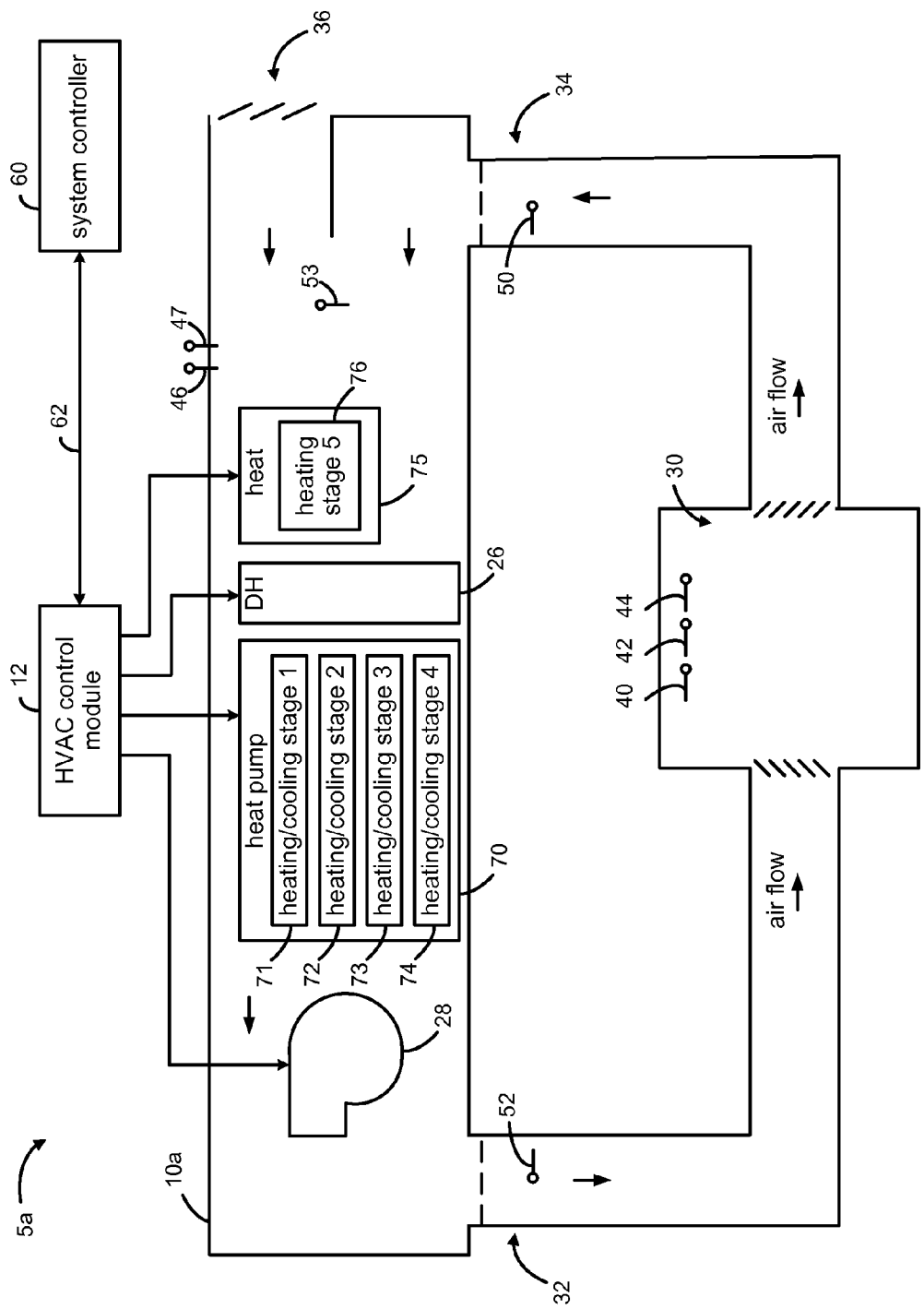
Figure 6:
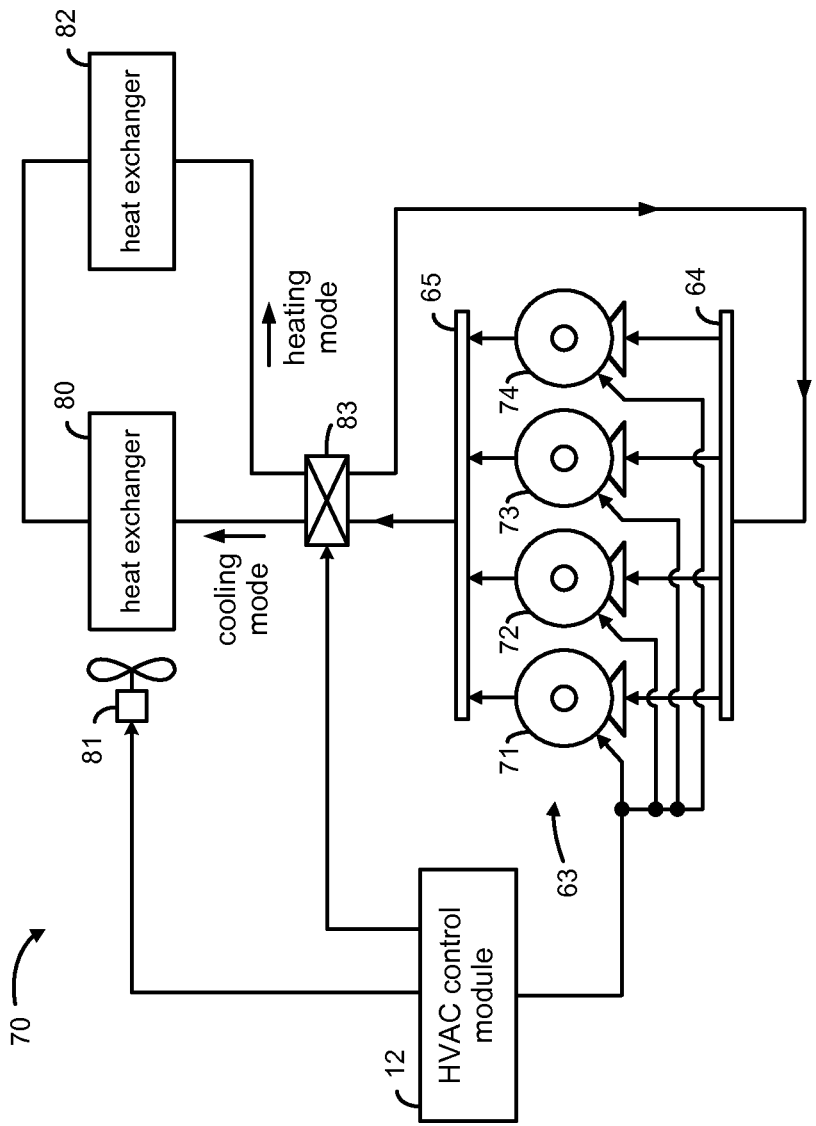
Figure 7:
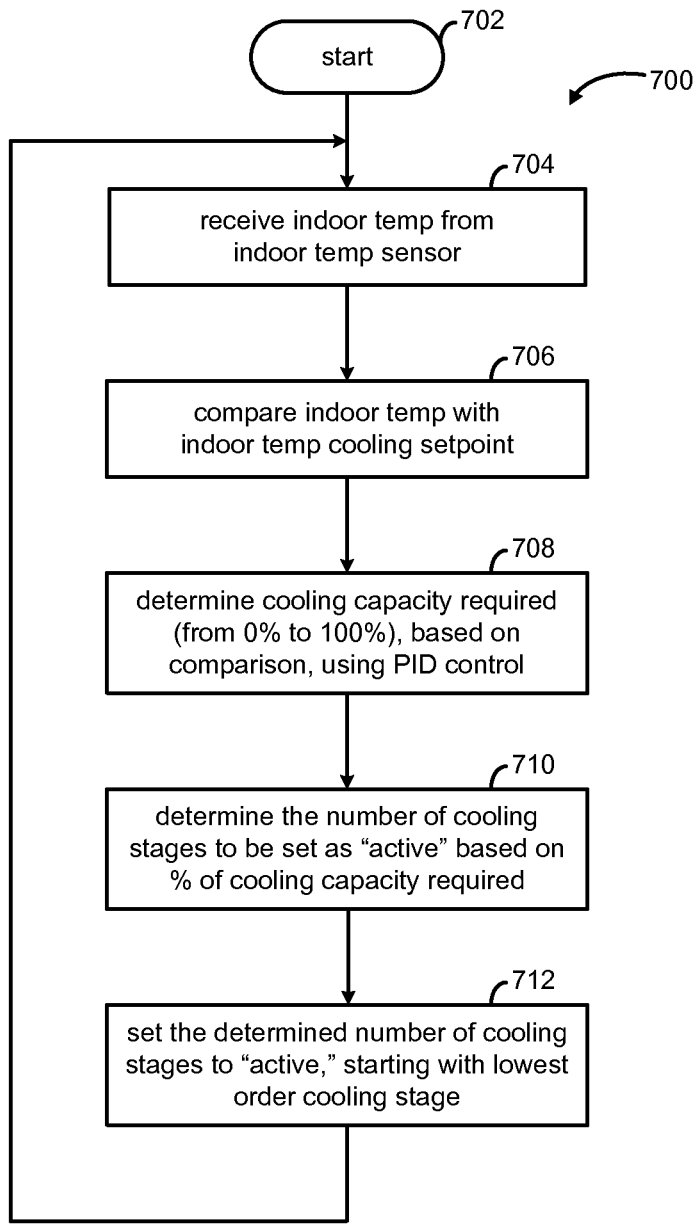
Figure 8:
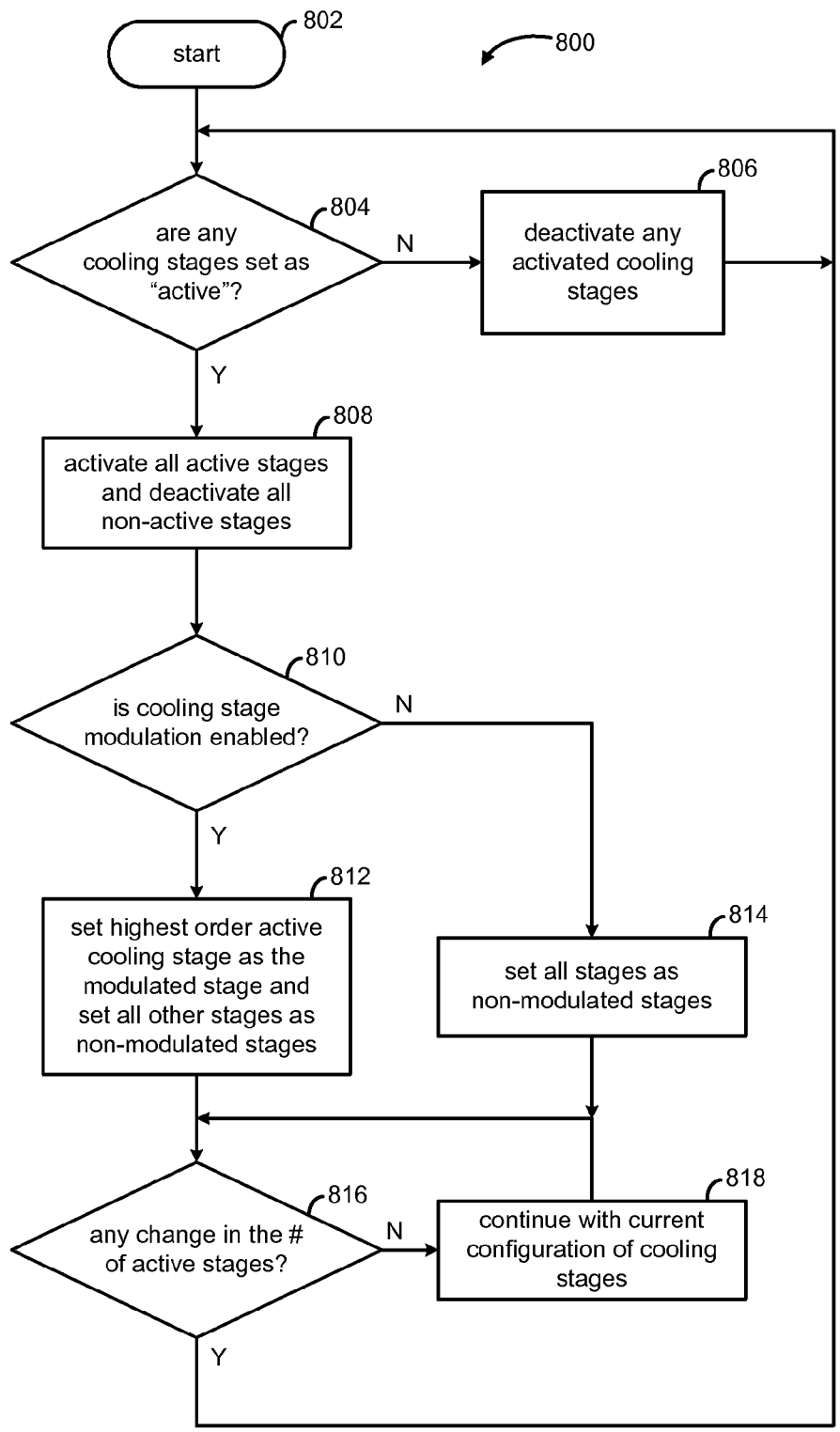
Figure 9:
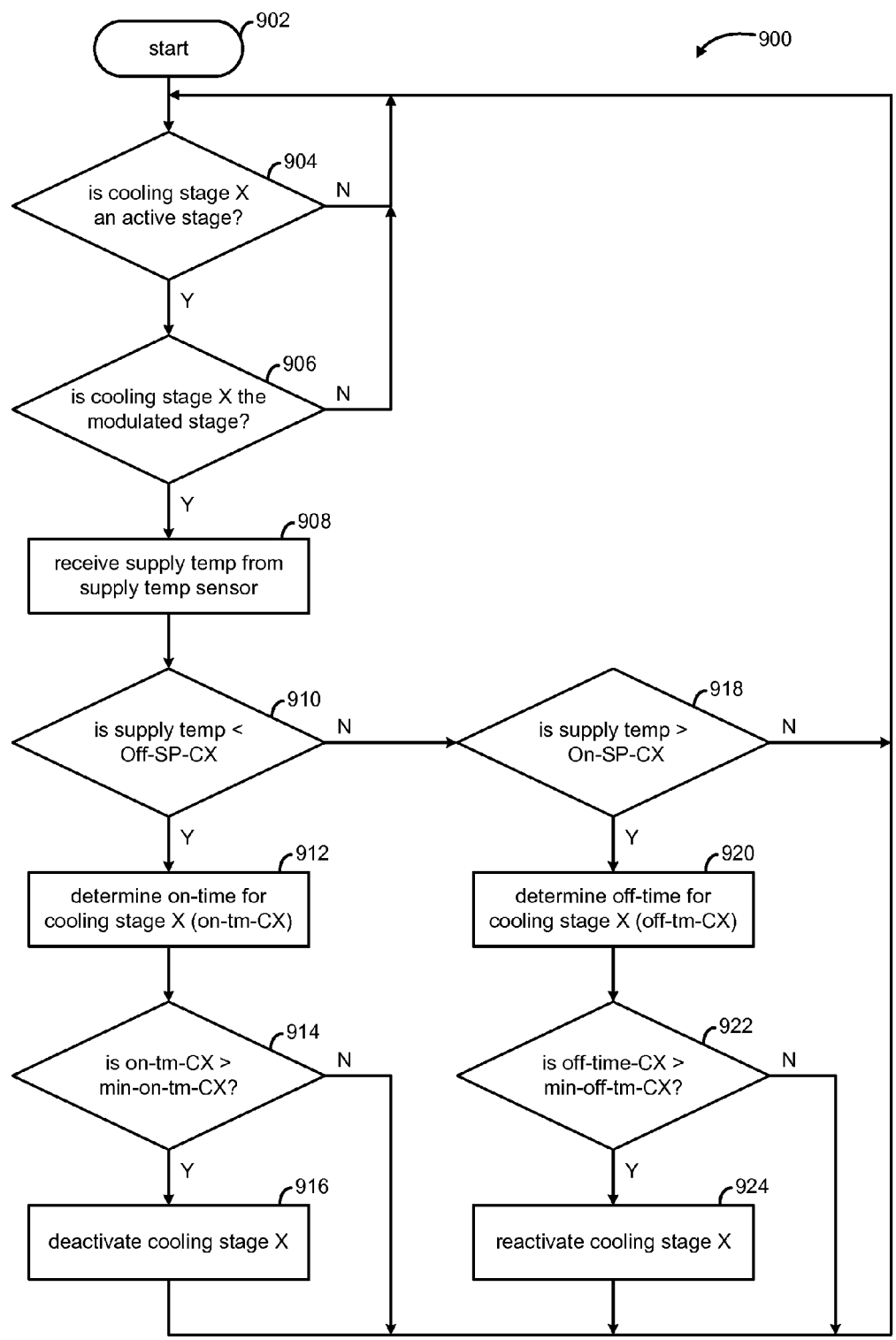
Figure 10:
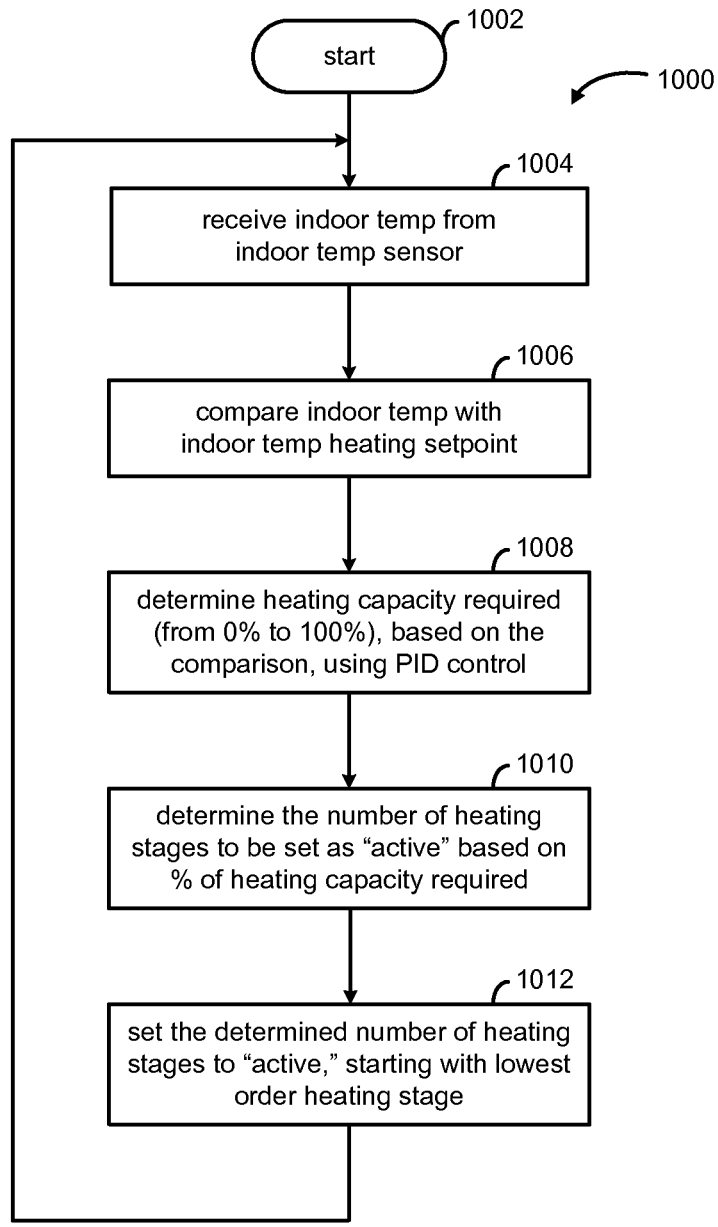
Figure 11:
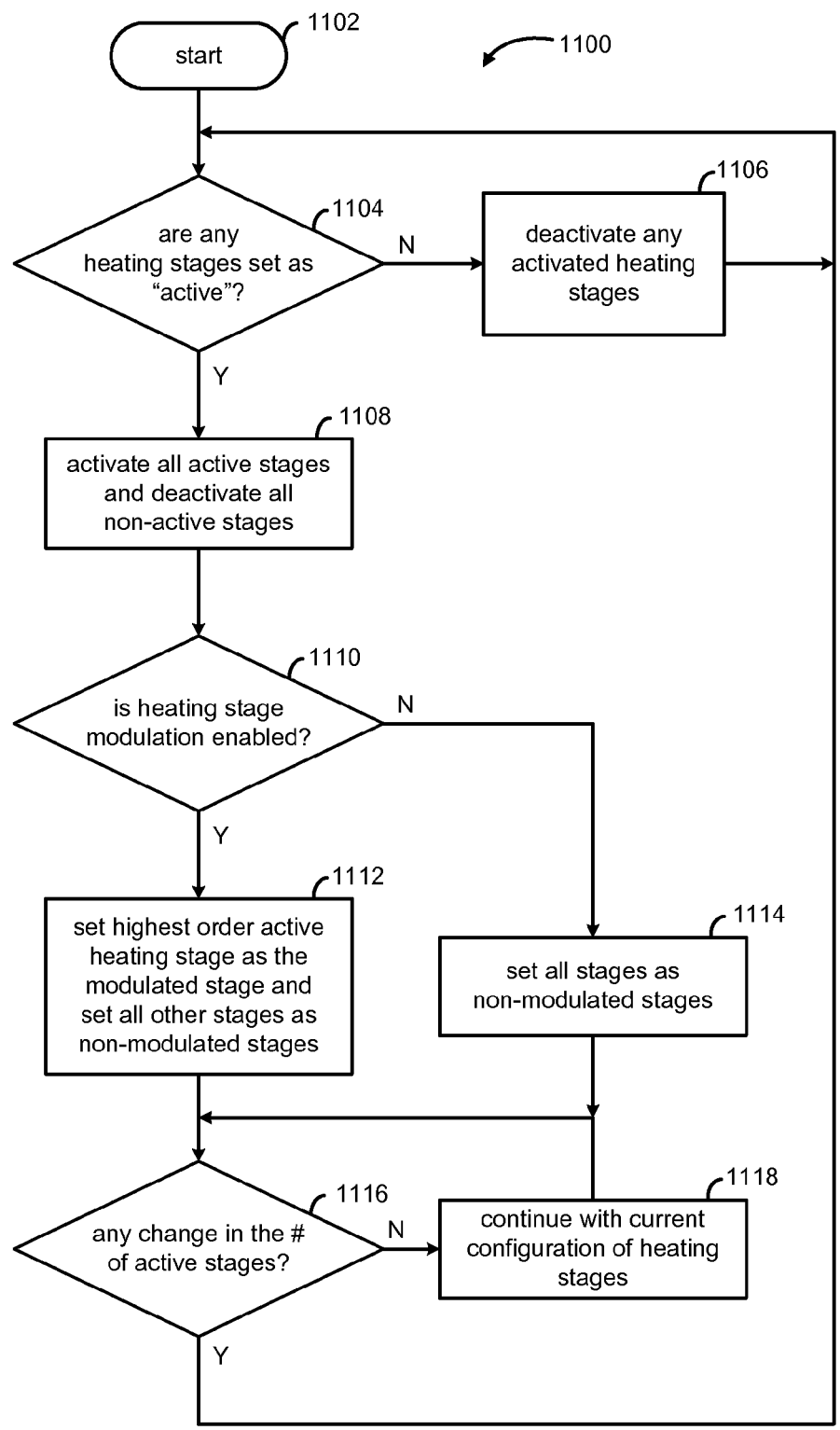
Figure 12:
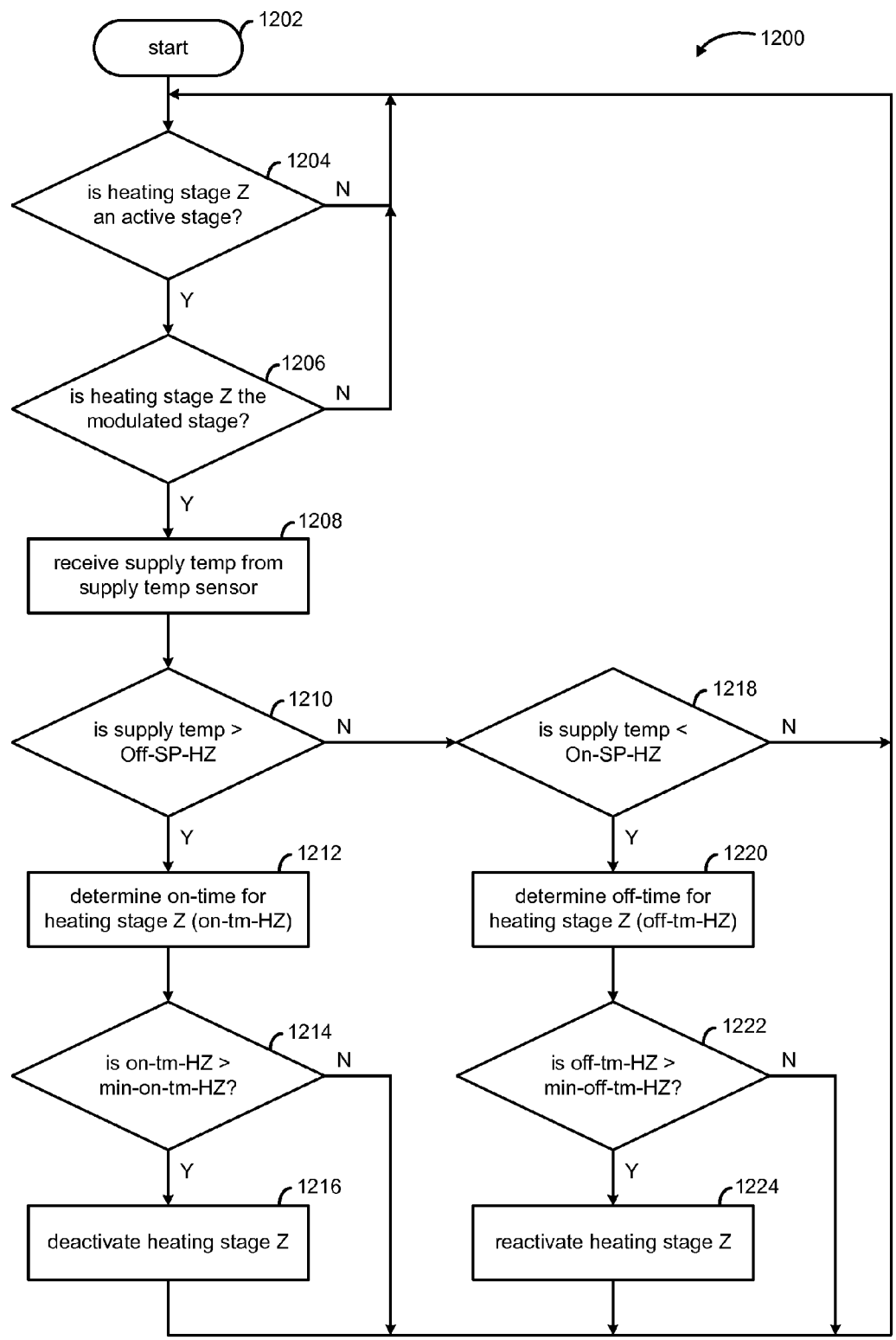
Figure 13:
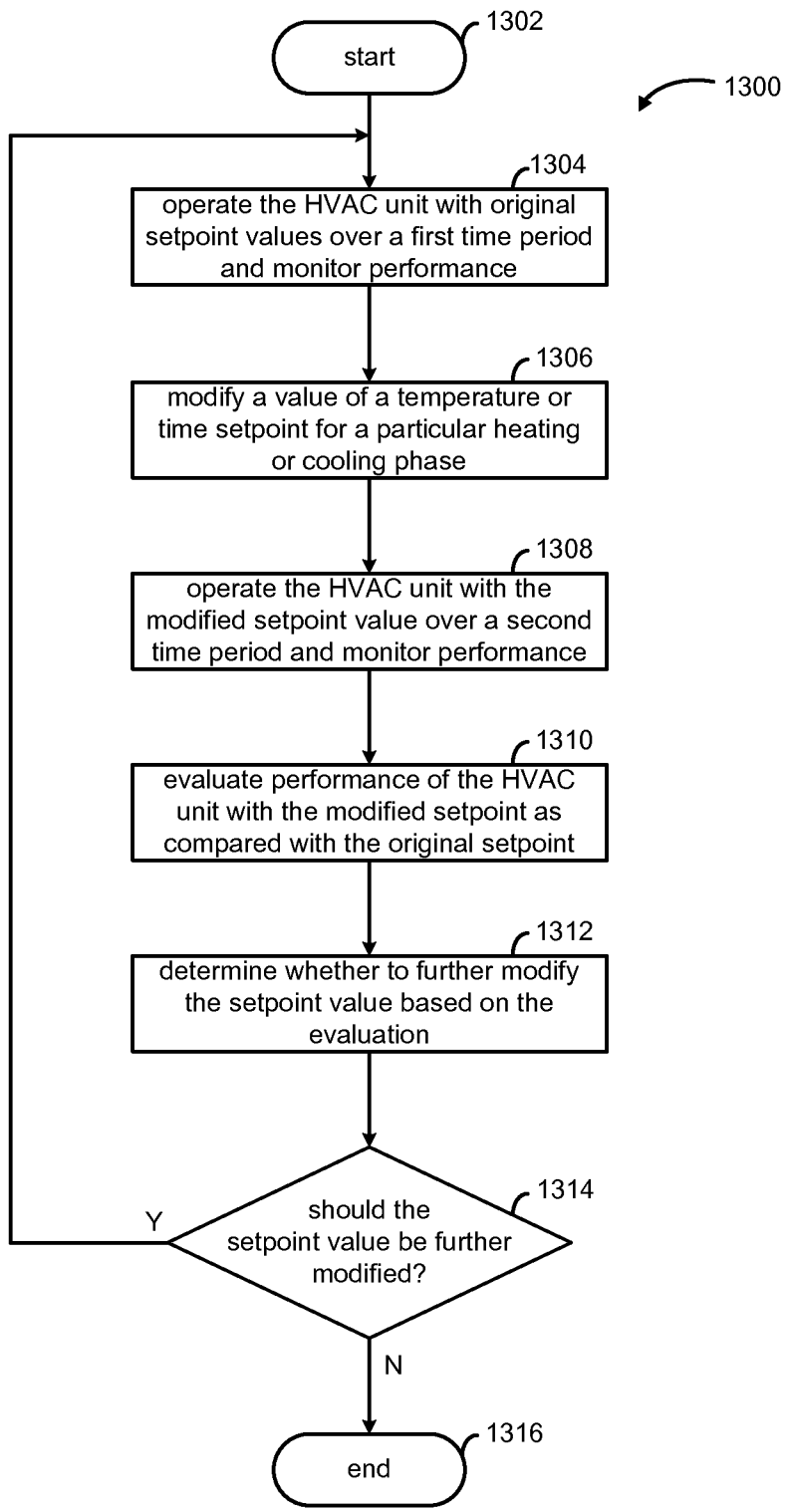

FIG. 1 is a schematic of an HVAC system;
FIG. 2 is another schematic of an HVAC system;
FIG. 3 is a diagram of an HVAC control module;
FIG. 4 is a schematic of a cooling unit of an HVAC system;
FIG. 5 is a schematic of another HVAC system;
FIG. 6 is a schematic of a heat pump unit of an HVAC system;
FIG. 7 is a flow chart for a control algorithm for an HVAC system;
FIG. 8 is a flow chart for a control algorithm for an HVAC system;
FIG. 9 is a flow chart for a control algorithm for an HVAC system;
FIG. 10 is a flow chart for a control algorithm for an HVAC system;
FIG. 11 is a flow chart for a control algorithm for an HVAC system;
FIG. 12 is a flow chart for a control algorithm for an HVAC system; and
FIG. 13 is a flow chart for a control algorithm for an HVAC system.

Corresponding reference numerals indicate corresponding parts throughout the several views of the drawings.

DETAILED DESCRIPTION

Example embodiments will now be described more fully with reference to the accompanying drawings.

As shown in FIG. 1, an HVAC system 5 may include an HVAC unit 10 and an HVAC control module 12. The HVAC unit 10 may have a cooling unit 14 with multiple cooling stages 15, 16, 17, 18, a heating unit 20 with multiple heating stages 21, 22, 23, 24, and a dehumidification unit 26. While the cooling unit 14 is shown with four cooling stages 15, 16, 17, 18, a cooling unit 14 with any number of cooling stages may be used. For example, a cooling unit 14 with a single cooling stage may be used. Further, while the heating unit 20 is shown with four heating stages 21, 22, 23, 24, a heating unit with any number of heating stages may be used. For example, a heating unit 20 with a single heating stage may be used.

In addition, the HVAC unit 10 may include an air handler unit 28 for circulating air within the HVAC system 5 to heat or cool an indoor space 30. For example, the HVAC unit 10 may be connected to an output duct 32 that routes air from an output of the HVAC unit 10 to the indoor space 30. The HVAC unit 10 may also include an input duct 34 that routes air from the indoor space 30 back to the HVAC unit 10. The HVAC unit 10 may also include an outdoor air input duct 36 that routes outdoor air into the HVAC unit 10. While the indoor space 30 is shown as a single room, it is understood that the indoor space 30 may include any part of an interior of a building, including, for example, any number of rooms of an interior of a building.

The HVAC control module 12 may control activation and deactivation of the cooling unit 14, including each of the cooling stages 15, 16, 17, 18. The HVAC control module 12 may also control activation and deactivation of the heating unit 20, including each of the heating stages 21, 22, 23, 24. The HVAC control module 12 may also control activation and deactivation of the dehumidification unit 26.

For example, the HVAC unit 10 may be a rooftop unit (or RTU) located on a rooftop of the building with one or more interior spaces that are being cooled, heated, or dehumidified by the HVAC unit 10. The HVAC control module 12 may be, for example, a MultiFlex RCB Rooftop Controller available from Computer Process Controls, Inc., of Kennesaw, Ga.

As described in further detail below, the HVAC control module 12 may determine an amount of heating or cooling capacity required for the indoor space 30 and may activate one or more of the heating stages 21, 22, 23, 24 or one or more of the cooling stages 15, 16, 17, 18 based on the determined amount of heating or cooling capacity required. As further described below, the HVAC control module 12 may then operate one of the activated stages in a modulated or pulse mode whereby the modulated stage is deactivated and then reactivated based on certain time and temperature setpoints. For example, the HVAC control module 12 may monitor a temperature of the HVAC unit 10, such as a supply temperature, and compare the monitored temperature with a deactivation or off-temperature setpoint. The HVAC control module 12 may also monitor an on-time of the modulated stage, corresponding to a time elapsed since the modulated stage was activated, and compare the monitored on-time with an on-time setpoint for the modulated stage. For cooling, when the monitored temperature is below the deactivation or off-temperature setpoint and the on-time is greater than the on-time setpoint, the HVAC control module 12 may deactivate the modulated cooling stage. For heating, when the monitored temperature is above the deactivation or off-temperature setpoint and the on-time is greater than the on-time setpoint, the HVAC control module 12 may deactivate the modulated heating stage.

As discussed in further detail below, once deactivated, the HVAC control module 12 may continue to monitor the particular temperature of the HVAC unit 10, such as the supply temperature, and compare the monitored temperature with an activation or on-temperature setpoint. The HVAC control module 12 may also monitor an off-time of the modulated stage, corresponding to a time elapsed since the modulated stage was deactivated, and compare the monitored off-time with an off-time setpoint for the modulated stage. For cooling, when the monitored temperature is above the activation or on-temperature setpoint and the off-time is greater than the off-time setpoint, the HVAC control module 12 may activate the modulated cooling stage. For heating, when the monitored temperature is below the activation or on-temperature setpoint and the off-time is greater than the off-time setpoint, the HVAC control module 12 may activate the modulated heating stage.

In this way, the HVAC control module 12 may modulate or pulse one of the heating or cooling stages by deactivating and reactivating the designated modulated stage. Deactivation of a heating or cooling stage results in reduced energy consumption and costs and more efficient operation of the HVAC unit 10. As such, modulating one of the heating or cooling stages results in lower energy consumption, as compared with operation of all of the heating or cooling stages without modulating one of the heating or cooling stages. In this way, the HVAC control module 12 is able to provide sufficient heating or cooling, in accordance with the amount of heating or cooling capacity required for the indoor space 30, while reducing energy consumption and increasing the efficiency of the HVAC unit 10.

With reference again to FIG. 1, the HVAC control module 12 may be connected to and in communication with a number of environmental sensors. For example, the HVAC control module 12 may monitor and receive indoor space temperature data from an indoor air temperature sensor 40 located within or near the indoor space 30. Further, the HVAC control module 12 may monitor and receive indoor humidity data from an indoor humidity sensor 42 located within or near the indoor space 30. Further, the HVAC control module 12 may monitor and receive indoor pressure data from an indoor pressure sensor 44 located within or near the indoor space 30. Any number of indoor air temperature sensors 40, indoor humidity sensors 42, and indoor pressure sensors 44, may be used.

The HVAC control module 12 may also monitor and receive outside temperature data from an outside air temperature sensor 46 and outside humidity data from an outside humidity sensor 47. As shown in FIG. 1, for example, if the HVAC unit 10 is an RTU, the outside air temperature sensor 46 and the outside humidity sensor 47 may be attached to an exterior of the RTU.

The HVAC control module 12 may also monitor and receive return air temperature data from a return air temperature sensor 50 mounted in the return air flow entering the HVAC unit 10. The HVAC control module 12 may also monitor and receive supply temperature data from a supply air temperature sensor 52 mounted in the supply air flow exiting the HVAC unit 10. The HVAC control module 12 may also monitor and receive temperature data from a mixed air temperature sensor 53 mounted in the mixed air flow (i.e., return air mixed with outdoor air) of the HVAC unit 10.

The HVAC control module 12 may monitor data received from the various environmental sensors, compare the received data to various predetermined setpoints, and activate and deactivate individual cooling stages 15, 16, 17, 18 of the cooling unit 14 and individual heating stages 21, 22, 23, 24 of the heating unit 20, as appropriate.

In addition, the HVAC control module 12 may be in communication with a system controller 60 via a communication bus 62. The system controller 60 may be, for example, an Einstein RX Refrigeration Controller, an Einstein BX Building/HVAC Controller, an E2 RX Refrigeration Controller, an E2 BX HVAC Controller, or an E2 CX Convenience Store Controller available from Computer Process Controls, Inc., of Kennesaw, Ga.

The system controller 60 may communicate setpoints to the HVAC control module 12. For example, the system controller 60 may receive input from a user to modify individual setpoints used by the HVAC control module 12. Alternatively, the system controller 60 may monitor data received from the various environmental sensors and may generate and send heating or cooling commands to the HVAC control module 12. For example, the system controller 60 may issue requests for heating or cooling, based on the data received from the various environmental sensors. Additionally, the system controller 60 may issue requests for activation or deactivation of individual cooling stages 15, 16, 17, 18 of the cooling unit 14 and/or individual heating stages 21, 22, 23, 24 of the heating unit 20, as appropriate, based on the data received from the various environmental sensors.

As shown in FIG. 2, the system controller 60 may be in communication with multiple HVAC control modules 12 for multiple HVAC units 10. In this way, the system controller 60 may communicate setpoints to each of the HVAC control modules 12 and/or may issue requests for heating or cooling or for activation or deactivation of individual heating stages 21, 22, 23, 24 of the heating units 20 and/or individual cooling stages 15, 16, 17, 18 of the cooling units 14 of each of the various HVAC units 10. In this way, a single HVAC system 5 may include multiple HVAC units 10.

Alternatively, the HVAC control modules 12 for each of the various HVAC units 10 may communicate with each other via the communication bus 62, with or without involvement of the system controller 60. For example, the HVAC control modules 12 may coordinate activation and deactivation of the various cooling stages 15, 16, 17, 18 of the cooling units 14 and the various heating stages 21, 22, 23, 24 of the heating units 20 across all of the HVAC units 10 of an HVAC system 5.

With reference to FIG. 3, the HVAC control module 12 may include a processor 100 and memory 102. The memory 102 may store control programs 104 and various setpoints 106 for operation of the associated HVAC unit 10, as discussed in further detail below.

The control programs 104 include processor-executable instructions that are stored on a non-transitory tangible computer readable medium. The control programs may also include stored data. Non-limiting examples of the non-transitory tangible computer readable medium are nonvolatile memory, magnetic storage, and optical storage.

The HVAC control module 12 may include inputs 108, outputs 110, and communication ports 112. For example, the HVAC control module 12 may receive data through the inputs 108 from the various environmental sensors described above and shown in FIG. 1. The HVAC control module 12 may control the cooling unit 14, the heating unit 20, the dehumidification unit 26, and the air handler unit 28 through the outputs 110. For example, the HVAC control module 12 may activate and deactivate the individual cooling stages 15, 16, 17, 18 of the cooling unit 14 and the individual heating stages 21, 22, 23, 24 of the heating unit 20 through the outputs 110. The HVAC control module 12 may also receive proofing signals from the individual cooling stages 15, 16, 17, 18 of the cooling unit 14 and the individual heating stages 21, 22, 23, 24 of the heating unit 20 through the inputs 108 to confirm that the individual stages have responded appropriately to the activation or deactivation signals.

The HVAC control module 12 may communicate with the system controller 60 or with other HVAC control modules 12 through the communication ports 112. In addition, a user may connect and communicate with the HVAC control module 12 through one of the communication ports 112 with a computing device, such as a mobile communication device, a personal digital assistant, a laptop, a personal computer, etc. In this way, the setpoints 106 stored in the memory 102 can be reviewed or modified, as appropriate, through communication via the communication ports 112.

With reference to FIG. 4, the HVAC control module 12 is shown with the cooling unit 14. The cooling unit 14 includes one or more compressors 63, connected to a common suction header 64 and a common discharge header 65. The cooling unit 14 also includes a condenser 66 and a condenser fan 67. The cooling unit also includes an evaporator 69. The one or more compressors 63 compress refrigerant vapor that is delivered to the condenser 66 where the refrigerant vapor is liquefied at high pressure, thereby rejecting heat to the outside air. The liquid refrigerant exiting the condenser 66 is then delivered to the evaporator 69. As hot air moves across the evaporator 69, the liquid turns into gas thereby removing heat from the air. Air is drawn across the evaporator 69 by the air handler unit 28 (shown in FIG. 1). The low pressure gas is then delivered to the compressors 63 and again compressed to a high pressure gas to start the refrigeration cycle again. While the cooling unit 14 of FIG. 4 is shown with four compressors, any number of compressors may be used.

As shown in FIG. 4, each of the compressors 63 corresponds to one of the cooling stages 15, 16, 17, 18. As such, when a request for activation or deactivation of a cooling stage 15, 16, 17, 18 is made, a corresponding compressor 63 can be appropriately activated or deactivated. In this way, each of the compressors 63 may have a fixed capacity and when activation of an additional cooling stage 15, 16, 17, 18 is requested the corresponding compressor 63 can be activated.

Alternatively, one or more of the compressors 63 may have a variable capacity. For example, one or more of the compressors 63 may be configured with an unloader device such that the compressor 63 can be operated in a low capacity mode and a high capacity mode. In such case, the compressor 63 with the unloader device may comprise two separate cooling stages. For example, the compressor 63 operated in the low capacity mode with the unloader device activated may correspond to a first cooling stage, and the compressor 63 operated in the high capacity mode with the unloader device deactivated may correspond to a second cooling stage.

Various compressor capacity modulation systems can be used. For example, if scroll compressors are used, compressor capacity may be varied by using a scroll separation system that unloads the compressor by separating scroll members of the compressor. A scroll compressor with a scroll separation system that unloads the compressor by separating the scroll members is described in U.S. Pat. No. 6,213,731, the disclosure of which is incorporated herein by reference. Further, compressor capacity may be varied by using a delayed suction system that modulates compressor capacity by venting an intermediate pressurized chamber to the suction chamber, as described in U.S. Pat. No. 6,821,092, the disclosure of which is incorporated herein by reference. Further, compressor capacity may be varied by using a refrigerant injection system, as described in U.S. Pat. No. 6,619,936, the disclosure of which is incorporated herein by reference. Further, compressor capacity may be varied by using a blocked suction gas system, as described in U.S. Pat. No. 6,206,652, the disclosure of which is incorporated herein by reference. Additionally, one or more of the compressors 63 may include a variable speed electric motor whereby compressor capacity can be varied by varying the speed of the electric motor.

With reference to FIG. 5, an alternative HVAC system 5a and HVAC unit 10a are shown. The HVAC system 5a and HVAC unit 10a are similar to the HVAC system 5 and HVAC unit 10a of FIG. 1, except that the HVAC unit 10a includes a heat pump unit 70 in place of the cooling unit 14. The heat pump unit 70 can be operated in either a heating mode or a cooling mode. As such, the heat pump unit 70 includes multiple heat pump stages 71, 72, 73, 74 that can be operated as either heating stages or cooling stages. When operated in the heating mode, the heat pump stages 71, 72, 73, 74 function as heating stages. When operated in the cooling mode, the heat pump stages 71, 72, 73, 74 function as cooling stages. In addition, the HVAC unit 10a includes an additional heating unit 75 with an additional heating stage 76. The additional heating stage 76 is generally used as a backup heating stage when all heat pump stages 71, 72, 73, 74 are operating as heating stages and additional heating capacity is still needed.

With reference to FIG. 6, the HVAC control module 12 is shown with the heat pump unit 70. The heat pump unit 70 includes one or more compressors 63, connected to a common suction header 64 and a common discharge header 65. The heat pump unit 70 also includes a first heat exchanger 80, a fan 81, and a second heat exchanger 82. Air is drawn across the second heat exchanger 82 by the air handler unit 28 (shown in FIG. 5). The heat pump unit 70 also includes a reversing valve 83 which is controlled by the HVAC control module 12 to direct compressed refrigerant from the common discharge header 65 to either the first heat exchanger 80 or the second heat exchanger 82, depending on whether the heat pump unit 70 is being operated in a heating mode or a cooling mode. In the cooling mode, refrigerant is delivered from the compressors 63 and the common discharge header 65 to the first heat exchanger 80, followed by the second heat exchanger 82, and then back to the common suction header 64. In the heating mode, refrigerant is delivered from the compressors 63 and the common discharge header 65 to the second heat exchanger 82, followed by the first heat exchanger 82, and then back to the common suction header 64. In each case, low pressure gas is delivered back to the compressors 63 and compressed to a high pressure gas to start the cycle again. While the heat pump unit 70 of FIG. 6 is shown with four compressors, any number of compressors may be used.

As shown in FIG. 6, each of the compressors 63 corresponds to one of the heat pump stages 71, 72, 73, 74. As such, when a request for activation or deactivation of a heat pump stage 71, 72, 73, 74 is made, a corresponding compressor 63 can be appropriately activated or deactivated. In this way, each of the compressors 63 may have a fixed capacity and when activation of an additional heat pump stage 71, 72, 73, 74 is requested, the corresponding compressor 63 will be activated.

Alternatively, and as described above with respect to the cooling unit 14, one or more of the compressors 63 may have a variable capacity. For example, one or more of the compressors 63 may be configured with an unloader device such that the compressor 63 can be operated in a low capacity mode and a high capacity mode. In such case, the compressor 63 with the unloader device may comprise two separate heat pump stages 71, 72, 73, 74. For example, the compressor 63 operated in the low capacity mode with the unloader device activated may correspond to a first heat pump stage, and the compressor 63 operated in the high capacity mode with the unloader device deactivated may correspond to a second heat pump stage. The same types of compressor capacity modulation systems described above for use with the cooling unit 14 can also be used with the heat pump unit 70.

To control the HVAC units 10, 10a, the HVAC control module 12 may monitor a temperature of space to be heated or cooled and compare the monitored temperature to a setpoint. For example, the HVAC control module 12 may monitor the indoor space temperature as indicated by the indoor air temperature sensor 40 located within or near the indoor space 30, shown in FIGS. 1 and 5. The HVAC control module 12 may then compare the indoor space temperature with an indoor space temperature setpoint and determine the heating or cooling capacity required based on the comparison.

With reference to FIG. 7, a control algorithm 700 is shown for determining a required cooling capacity and determining a number of cooling stages to be set as "active." As discussed above, the cooling stages can be the cooling stages 15, 16, 17, 18 of the cooling unit 14 or the heat pump stages 71, 72, 73, 74 of the heat pump unit 70 operating in a cooling mode. Further, while the control algorithm 700 is described as being performed by the HVAC control module 12, the control algorithm 700 can likewise be executed by the system controller 60 in communication with the HVAC control module 12. The control algorithm 700 starts at 702. At 704, the HVAC control module 12 receives the indoor temperature from the indoor air temperature sensor 40. At 706, the indoor temperature is compared with an indoor temperature cooling setpoint. For example, the indoor temperature cooling setpoint may be 70 degrees Fahrenheit. At 708, the HVAC control module 12 may use a PID control strategy to determine the cooling capacity required, between 0% and 100%, based on the comparison between the indoor temperature and the indoor temperature cooling setpoint. For example, when the difference between the indoor temperature and the indoor temperature cooling setpoint is relatively small, less cooling capacity may be required. For example, the cooling capacity may be set to 25% of the total cooling capacity available. When the difference between the indoor temperature and the indoor temperature cooling setpoint is relatively large, more cooling capacity may be required. For example, the cooling capacity may be set to 100% of the total cooling capacity available. The HVAC control module 12 may use a PID control strategy to continually update the cooling capacity required, during subsequent iterations of the control algorithm 700, based on the monitored indoor temperature and the indoor temperature cooling setpoint.

At 710, the HVAC control module 12 may determine the number of cooling stages to be set as "active" based on the percentage of cooling capacity required. For example, if four cooling stages are available in the HVAC unit 10: a required cooling capacity of 25% will correspond to a single stage being set as active; a required cooling capacity of 50% will correspond to two stages being set as active; a required cooling capacity of 75% will correspond to three stages being set as active; and a required cooling capacity of 100% will correspond to four stages being set as active. For example, if three cooling stages are available in the HVAC unit 10: a required cooling capacity of 33% will correspond to a single stage being set as active; a required cooling capacity of 67% will correspond to two stages being set as active; and a required cooling capacity of 100% will correspond to three stages being set as active. For example, if two cooling stages are available in the HVAC unit 10: a required cooling capacity of 50% will correspond to a single stage being set as active; and a required cooling capacity of 100% will correspond to two stages being set as active. For example, if one cooling stage is available in the HVAC unit 10 a required cooling capacity of 100% will correspond to a single stage being set as active. In each case, a required cooling capacity of 0% will correspond to no cooling stages being set as active.

As shown in Table 1 below, the HVAC control module 12 may use PID On and Off % setpoints to set the cooling stages to active. Table 1 includes example setpoints for a cooling unit 14 with 1, 2, 3, and 4 cooling stages, and for a heat pump unit 70 with 1, 2, 3, and 4 heat pump stages operated in a cooling mode. As shown, for a single cooling stage, the single cooling stage may be set as active when the required cooling capacity is 100% and may continue to be set as active until the required cooling capacity is 0%. For 2 cooling stages: the first cooling stage may be set as active when the required cooling capacity is 50% and may continue to be set as active until the required cooling capacity is 0%; and the second cooling stage may be set as active when the required cooling capacity is 100% and may continue to be set as active until the required cooling capacity is 50%. For 3 cooling stages: the first cooling stage may be set as active when the required cooling capacity is 33% and may continue to be set as active until the required cooling capacity is 0%; the second cooling stage may be set as active when the required cooling capacity is 67% and may continue to be set as active until the required cooling capacity is 33%; and the third cooling stage may be set as active when the required cooling capacity is 100% and may continue to be set as active until the required cooling capacity is 67%. For 4 cooling stages: the first cooling stage may be set as active when the required cooling capacity is 25% and may continue to be set as active until the required cooling capacity is 0%; the second cooling stage may be set as active when the required cooling capacity is 50% and may continue to be set as active until the required cooling capacity is 25%; the third cooling stage may be set as active when the required cooling capacity is 75% and may continue to be set as active until the required cooling capacity is 100%.

TABLE 1

PID On and Off Setpoints for Units with 1 to 4 stages

| total # of stages | stage # | PID on % setpoint | PID off % setpoint |
| --- | --- | --- | --- |
| 1 | 1 | 100% | 0% |
| 2 | 1 | 50% | 0% |
|   | 2 | 100% | 50% |
| 3 | 1 | 33% | 0% |
|   | 2 | 67% | 33% |
|   | 3 | 100% | 67% |
| 4 | 1 | 25% | 0% |
|   | 2 | 50% | 25% |
|   | 3 | 75% | 50% |
|   | 4 | 100% | 75% |

At 712, the HVAC control module 12 may set the determined number of cooling stages to "active," starting with the lowest order cooling stage. For example, if four cooling stages are available and three cooling stages are to be set to active, the HVAC control module 12 may set cooling stages 1, 2, and 3 as active and may set cooling stage 4 as not active. If four cooling stages are available and two cooling stages are to be set to active, the HVAC control module 12 may set cooling stages 1 and 2 as active and cooling stages 3 and 4 as not active.

After 712, the HVAC control module 12 loops back to step 704 and starts the control algorithm over again.

With reference to FIG. 8, a control algorithm 800 is shown for activating and deactivating cooling stages and for setting a cooling stage as the modulated stage. As discussed above, the cooling stages can be the cooling stages 15, 16, 17, 18 of the cooling unit 14 or the heat pump stages 71, 72, 73, 74 of the heat pump unit 70 operating in a cooling mode. Further, while the control algorithm 800 is described as being performed by the HVAC control module 12, the control algorithm 800 can likewise be executed by the system controller 60 in communication with the HVAC control module 12. The control algorithm 800 starts at 802. At 804, the HVAC control module 12 determines whether any cooling stages are currently set as "active." As discussed above with respect to FIG. 7, cooling stages are set to active at step 712 of the control algorithm 700, based on the percentage of cooling capacity required.

At 804, when no cooling stages are set as active, the HVAC control module 12 proceeds to step 806 and deactivates any previously activated cooling stages. In other words, if any cooling stages are currently turned on, they are turned off at 806. If there are no cooling stages that are currently turned on, no action is taken at 806. After step 806, the HVAC control module 12 then loops back to step 804.

At 804, when there is at least one cooling stage set as active, the HVAC control module 12 proceeds to step 808. At 808, the HVAC control module 12 activates all of the cooling stages that are set as active (i.e., all active stages) and deactivates any cooling stages that are not set as active (i.e., all non-active stages). The HVAC control module 12 then proceeds to step 810.

At 810, the HVAC control module 12 determines whether cooling stage modulation is currently enabled. For example, a user may enable or disable cooling stage modulation. Additionally, the HVAC control module 12 may only enable cooling stage modulation in certain modes. For example, the HVAC control module 12 may disable cooling stage modulation in a defrost mode or when the dehumidification unit 26 is activated.

At 810, when cooling stage modulation is enabled, the HVAC control module 12 proceeds to step 812. At 812, the HVAC control module 12 sets the highest order active cooling stage as the modulated stage and sets all other stages as non-modulated stages. In this way, only one active stage is designated as the modulated stage. For example, if three cooling stages are set as active, cooling stages 1 and 2 are set as non-modulated stages and cooling stage 3 is set as the modulated stage. If two cooling stages are active, cooling stage 1 is set as a non-modulated stage and cooling stage 2 is set as the modulated stage. If one cooling stage is active, then cooling stage 1 is set as the modulated stage. After step 812, the HVAC control module 12 proceeds to step 816.

At 810, when cooling stage modulation is not enabled, the HVAC control module 12 proceeds to step 814 and sets all stages as non-modulated stages. After step 814, the HVAC control module 12 proceeds to step 816.

At 816, the HVAC control module 12 determines whether there has been any change in the number of active stages. For example, with reference to FIG. 7, as the indoor temperature changes the HVAC control module 12 may determine that more or less cooling capacity is required and may set a different number of cooling stages to be active stages. With reference again to FIG. 8, at 816 when there is no change in the number of active stages, the HVAC control module 12 proceeds to step 818 and continues operation with the current configuration of the cooling stages. In other words, at 818 operation proceeds with the existing active cooling stages and the existing designated modulated stage, if any. At 818, the HVAC control module 12 loops back to step 816 and determines whether there has been any change in the number of active stages. In this way, the HVAC control module 12 continues to operate with the existing configuration of cooling stages until there is a change in the number of cooling stages that are set as active stages.

At 816, when there has been a change in the number of active stages, the HVAC control module 12 loops back to 804 and starts the control algorithm 800 for activating and deactivating cooling stages and for setting a cooling stage as the modulated stage over again.

With reference to FIG. 9, a control algorithm 900 is shown for activating and deactivating the designated modulated cooling stage. As discussed above, the designated modulated cooling stage can be one of the cooling stages 15, 16, 17, 18 of the cooling unit 14 or one of the heat pump stages 71, 72, 73, 74 of the heat pump unit 70 operating in a cooling mode. Further, while the control algorithm 900 is described as being performed by the HVAC control module 12, the control algorithm 900 can likewise be executed by the system controller 60 in communication with the HVAC control module 12. As discussed above with reference to FIG. 8, when cooling stage modulation is enabled, the HVAC control module 12 sets the highest order active cooling stage as the modulated stage at step 812. While the control algorithm 900 is shown for "cooling stage X," when executed for a particular cooling stage, for example, the appropriate setpoints corresponding to the particular cooling stage are used. For example, when the control algorithm is executed for cooling stage 1, the appropriate setpoints associated with cooling stage 1 are used. As such, the control algorithm 900 can be executed for each of the particular cooling stages in parallel.

The algorithm starts at 902. At 904, the HVAC control module 12 determines whether the particular cooling stage is set as an active stage. When the cooling stage is not set as an active stage, the HVAC control module 12 loops back to step 904 and waits for the cooling stage to be set as an active cooling stage. At 904, when the cooling stage is set as an active stage, the HVAC control module 12 proceeds to 906 and determines whether the cooling stage is designated as the modulated stage. At 906, when the cooling stage is not designated as the modulated stage, the HVAC control module 12 loops back to 904 and waits for the cooling stage to be designated both as an active cooling stage and as the modulated stage.

At 906, when the cooling stage is both set as an active stage and designated as the modulated stage, the HVAC control module 12 proceeds to step 908.

At 908, the HVAC control module 12 receives the supply temperature as indicated by the supply air temperature sensor 52 mounted in the supply air flow of the HVAC unit 10, shown in FIGS. 1 and 5. While the control algorithm 900 is described with respect to use of the supply temperature as indicated by the supply air temperature sensor 52, other monitored or sensed temperatures of the HVAC unit 10, 10a or HVAC system 5, 5a can be alternatively used. For example, the return air temperature as indicated by the return air temperature sensor 50 mounted in the return air flow entering the HVAC unit 10 can alternatively be used. Additionally, the mixed air temperature as indicated by the mixed air temperature sensor 53 mounted in the mixed air flow can alternatively be used. Alternatively, the indoor space temperature as indicated by the indoor air temperature sensor 40 located within or near the indoor space 30 can alternatively be used. Depending on the specific temperature data used, appropriate setpoints, discussed below, can be used.

At 910, the HVAC control module 12 determines whether the monitored supply temperature is less than the off-temperature setpoint for the cooling stage. Each cooling stage has an associated off-temperature setpoint "Off-SP-CX" and an associated on-temperature setpoint "On-SP-CX" for use when the particular cooling stage is designated as the modulated stage. As used and described herein, in the setpoint abbreviations "On-SP-CX" and "Off-SP-CX", the "X" designates the particular cooling stage number. For example, the off-temperature setpoint for cooling stage 1 is abbreviated as Off-SP-C1 and the on-temperature setpoint for cooling stage 1 is abbreviated as On-SP-C1. When the particular cooling stage is set as the modulated stage, the HVAC control module 12 uses the appropriate off-temperature and on-temperature setpoints for the particular cooling stage in performing the control algorithm 900.

As an example, the on-temperature and off-temperature setpoints for cooling stages 1 through 4 may be as shown in Table 2:

TABLE 2

Cooling Modulation Setpoints for 4 Cooling Stages

| stage no. (X) | on-temp setpoint (On-SP-CX) | off-temp setpoint (Off-SP-CX) |
|---|---|---|
| 1 | 70 degrees | 60 degrees |
| 2 | 60 degrees | 55 degrees |
| 3 | 55 degrees | 50 degrees |
| 4 | 50 degrees | 45 degrees |

In this example, the on-temperature setpoint for cooling stage 1 is 70 degrees and the off-temperature setpoint for cooling stage 1 is 60 degrees. The on-temperature setpoint for cooling stage 2 is 60 degrees and the off-temperature setpoint for cooling stage 2 is 55 degrees. The on-temperature setpoint for cooling stage 3 is 55 degrees and the off-temperature setpoint for cooling stage 3 is 50 degrees. The on-temperature setpoint for cooling stage 4 is 50 degrees and the off-temperature setpoint for cooling stage 4 is 45 degrees. As discussed above, the setpoints can be configured or modified by the user.

At 910, the HVAC control module 12 determines whether the monitored supply temperature is less than the off-temperature setpoint for the particular cooling stage. At 910, when the supply temperature is less than the off-temperature setpoint for the particular cooling stage, the HVAC control module proceeds to step 912. At 912, the HVAC control module determines the on-time for the particular cooling stage "on-tm-CX." The on-time for the particular cooling stage corresponds to the elapsed time that the particular cooling stage has been running. In other words, the on-time for the particular cooling stage is the length of time since the particular cooling stage was last activated, or turned on. The HVAC control module 12 then proceeds to step 914.

At 914, the HVAC control module 12 determines whether the on-time for the particular cooling stage is greater than a minimum on-time threshold "min-on-tm-CX." Each cooling stage has an associated minimum run-time or on-time threshold, such that the cooling stage cannot be deactivated before the minimum run-time or on-time has elapsed. For example, the minimum on-time may be 5 minutes. The minimum on-time thresholds may be the same for all cooling stages or, alternatively, the minimum on-time thresholds may be different across the cooling stages.

At 914, when the on-time for the particular cooling stage is greater than the associated minimum on-time threshold, the HVAC control module 12 proceeds to step 916 and deactivates the particular cooling stage. The HVAC control module 12 then loops back to step 904. At 914, when the on-time for the particular cooling stage is not less than the minimum on-time threshold, the HVAC control module 12 loops back to step 904 without deactivating the particular cooling stage. In this way, the particular cooling stage is not deactivated unless it has been on for the minimum on-time.

Referring back to step 910, when the supply temperature is not less than the off-temperature setpoint for the particular cooling stage, the HVAC control module 12 proceeds to step 918.

At 918, the HVAC control module 12 determines whether the supply temperature is greater than the on-temperature setpoint for the particular cooling stage. The on-temperature setpoint, for example, is described above with respect to Table 1. At 918, when the supply temperature is not greater than the on-temperature setpoint for the particular cooling stage, the HVAC control module 12 loops back to step 904.

At 918, when the supply temperature is greater than the on-temperature setpoint for the particular cooling stage, the HVAC control module 12 proceeds to step 920. At 920, the HVAC control module 12 determines the off-time for the particular cooling stage "off-tm-CX." The off-time for the particular cooling stage corresponds to the elapsed time that the particular cooling stage has been turned off. In other words, the off-time for the particular cooling stage is the length of time since the particular cooling stage was last deactivated, or turned off. The HVAC control module 12 then proceeds to step 922.

At 922, the HVAC control module 12 determines whether the off-time for the particular cooling stage is greater than a minimum off-time threshold "min-off-tm-CX." Each cooling stage has an associated minimum off-time threshold, such that the cooling stage cannot be activated before the minimum off-time has elapsed. For example, the minimum off-time may be 2 minutes. The minimum off-time thresholds may be the same for all cooling stages or, alternatively, the minimum off-time thresholds may be different across the cooling stages.

At 922, when the off-time for the particular cooling stage is greater than the minimum off-time threshold, the HVAC control module 12 proceeds to step 924 and reactivates the particular cooling stage. The HVAC control module 12 then loops back to step 904. At 922, when the off-time for the particular cooling stage is not less than the minimum off-time threshold, the HVAC control module 12 loops back to step 904.

In this way, the HVAC control module 12 modulates the designated modulated stage on and off, in accordance with the on-temperature and off-temperature setpoints for the cooling stage. By periodically deactivating the designated modulated stage, the HVAC system 5, 5a consumes less energy and operates with greater energy efficiency as compared with a similar HVAC system that operates without cooling stage modulation. In this way, the described cooling stage modulation control system and method provides for more energy efficient HVAC system operation.

With reference to FIG. 10, a control algorithm 1000 is shown for determining a required heating capacity and determining a number of heating stages to be set as "active." As discussed above, the heating stages can be the heating stages 21, 22, 23, 24 of the heating unit 20 or the heat pump stages 71, 72, 73, 74 of the heat pump unit 70 operating in a heating mode. Further, while the control algorithm 1000 is described as being performed by the HVAC control module 12, the control algorithm 1000 can likewise be executed by the system controller 60 in communication with the HVAC control module 12. The control algorithm 1000 starts at 1002. At 1004, the HVAC control module 12 receives the indoor temperature from the indoor air temperature sensor 40. At 1006, the indoor temperature is compared with an indoor temperature heating setpoint. For example, the indoor temperature heating setpoint may be 72 degrees Fahrenheit. At 1008, the HVAC control module 12 may use a PID control strategy to determine the heating capacity required, between 0% and 100%, based on the comparison between the indoor temperature and the indoor temperature heating setpoint. For example, when the difference between the indoor temperature and the indoor temperature heating setpoint is relatively small, less heating capacity may be required. For example, the heating capacity may be set to 25% of the total heating capacity available. When the difference between the indoor temperature and the indoor temperature heating setpoint is relatively large, more heating capacity may be required. For example, the heating capacity may be set to 100% of the total heating capacity available. The HVAC control module 12 may use a PID control strategy to continually update the heating capacity required, during subsequent iterations of the control algorithm 1000, based on the monitored indoor temperature and the indoor temperature heating setpoint.

At 1010, the HVAC control module 12 may determine the number of heating stages to be set as "active" based on the percentage of heating capacity required. For example, if four heating stages are available in the HVAC unit 10: a required heating capacity of 25% will correspond to a single stage being set as active; a required heating capacity of 50% will correspond to two stages being set as active; a required heating capacity of 75% will correspond to three stages being set as active; and a required heating capacity of 100% will correspond to four stages being set as active. For example, if three heating stages are available in the HVAC unit 10: a required heating capacity of 33% will correspond to a single stage being set as active; a required heating capacity of 67% will correspond to two stages being set as active; and a required heating capacity of 100% will correspond to three stages being set as active. For example, if two heating stages are available in the HVAC unit 10: a required heating capacity of 50% will correspond to a single stage being set as active; and a required heating capacity of 100% will correspond to two stages being set as active. For example, if one heating stage is available in the HVAC unit 10 a required heating capacity of 100% will correspond to a single stage being set as active. In each case, a required heating capacity of 0% will correspond to no heating stages being set as active.

As shown in Table 3 below, the HVAC control module 12 may use PID On and Off % setpoints to set the heating stages to active. Table 3 includes example setpoints for a heating unit 20 with 1, 2, 3, and 4 heating stages, and for a heat pump unit 70 with 1, 2, 3, and 4 heat pump stages operated in a heating mode. As shown, for a single heating stage, the single heating stage may be set as active when the required cooling capacity is 100% and may continue to be set as active until the required heating capacity is 0%. For 2 heating stages: the first heating stage may be set as active when the required heating capacity is 50% and may continue to be set as active until the required heating capacity is 0%; and the second heating stage may be set as active when the required heating capacity is 100% and may continue to be set as active until the required heating capacity is 50%. For 3 heating stages: the first heating stage may be set as active when the required heating capacity is 33% and may continue to be set as active until the required heating capacity is 0%; the second heating stage may be set as active when the required heating capacity is 67% and may continue to be set as active until the required heating capacity is 33%; and the third heating stage may be set as active when the required heating capacity is 100% and may continue to be set as active until the required heating capacity is 67%. For 4 heating stages: the first heating stage may be set as active when the required heating capacity is 25% and may continue to be set as active until the required heating capacity is 0%; the second heating stage may be set as active when the required heating capacity is 50% and may continue to be set as active until the required heating capacity is 25%; the third heating stage may be set as active when the required heating capacity is 75% and may continue to be set as active until the required heating capacity is 100%.

TABLE 3

PID On and Off Setpoints for Units with 1 to 4 stages

| total # of stages | stage # | PID on % setpoint | PID off % setpoint |
| --- | --- | --- | --- |
| 1 | 1 | 100% | 0% |
| 2 | 1 | 50% | 0% |
|   | 2 | 100% | 50% |
| 3 | 1 | 33% | 0% |
|   | 2 | 67% | 33% |
|   | 3 | 100% | 67% |
| 4 | 1 | 25% | 0% |
|   | 2 | 50% | 25% |
|   | 3 | 75% | 50% |
|   | 4 | 100% | 75% |

At 1012, the HVAC control module 12 may set the determined number of heating stages to "active," starting with the lowest order heating stage. For example, if four heating stages are available and three heating stages are to be set to active, the HVAC control module 12 may set heating stages 1, 2, and 3 as active and may set heating stage 4 as not active. If four heating stages are available and two heating stages are to be set to active, the HVAC control module 12 may set heating stages 1 and 2 as active and heating stages 3 and 4 as not active.

After 1012, the HVAC control module 12 loops back to step 1004 and starts the control algorithm over again.

With reference to FIG. 11, a control algorithm 1100 is shown for activating and deactivating heating stages and for setting a heating stage as the modulated stage. As discussed above, the heating stages can be the heating stages 21, 22, 23, 24 of the heating unit 20 or the heat pump stages 71, 72, 73, 74 of the heat pump unit 70 operating in a heating mode. Further, while the control algorithm 1100 is described as being performed by the HVAC control module 12, the control algorithm 1100 can likewise be executed by the system controller 60 in communication with the HVAC control module 12. The control algorithm 1100 starts at 1102. At 1104, the HVAC control module 12 determines whether any heating stages are currently set as "active." As discussed above with respect to FIG. 10, heating stages are set to active at step 1012 of the control algorithm 1000, based on the percentage of heating capacity required.

At 1104, when no heating stages are set as active, the HVAC control module 12 proceeds to step 1106 and deactivates any previously activated heating stages. In other words, if any heating stages are currently turned on, they are turned off at 1106. If there are no heating stages that are currently turned on, no action is taken at 1106. After step 1106, the HVAC control module 12 then loops back to step 1104.

At 1104, when there is at least one heating stage set as active, the HVAC control module 12 proceeds to step 1108. At 1108, the HVAC control module 12 activates all of the heating stages that are set as active (i.e., all active stages) and deactivates any heating stages that are not set as active (i.e., all non-active stages). The HVAC control module 12 then proceeds to step 1110.

At 1110, the HVAC control module 12 determines whether heating stage modulation is currently enabled. For example, a user may enable or disable heating stage modulation. Additionally, the HVAC control module 12 may only enable heating stage modulation in certain modes. For example, the HVAC control module 12 may disable heating stage modulation in a defrost mode or when the dehumidification unit 26 is activated.

At 1110, when heating stage modulation is enabled, the HVAC control module 12 proceeds to step 1112. At 1112, the HVAC control module 12 sets the highest order active heating stage as the modulated stage and sets all other stages as non-modulated stages. In this way, only one active stage is designated as the modulated stage. For example, if three heating stages are set as active, heating stages 1 and 2 are set as non-modulated stages and heating stage 3 is set as the modulated stage. If two heating stages are active, heating stage 1 is set as a non-modulated stage and heating stage 2 is set as the modulated stage. If one heating stage is active, then heating stage 1 is set as the modulated stage. After step 1112, the HVAC control module 12 proceeds to step 1116.

At 1110, when heating stage modulation is not enabled, the HVAC control module 12 proceeds to step 1114 and sets all stages as non-modulated stages. After step 1114, the HVAC control module 12 proceeds to step 1116.

At 1116, the HVAC control module 12 determines whether there has been any change in the number of active stages. For example, with reference to FIG. 10, as the indoor temperature changes the HVAC control module 12 may determine that more or less heating capacity is required and may set a different number of heating stages to be active stages. With reference again to FIG. 11, at 1116 when there is no change in the number of active stages, the HVAC control module 12 proceeds to step 1118 and continues operation with the current configuration of the heating stages. In other words, at 1118 operation proceeds with the existing active heating stages and the existing designated modulated stage, if any. At 1118, the HVAC control module 12 loops back to step 1116 and determines whether there has been any change in the number of active stages. In this way, the HVAC control module 12 continues to operate with the existing configuration of heating stages until there is a change in the number of heating stages that are set as active stages.

At 1116, when there has been a change in the number of active stages, the HVAC control module 12 loops back to 1104 and starts the control algorithm 1100 for activating and deactivating heating stages and for setting a heating stage as the modulated stage over again.

With reference to FIG. 12, a control algorithm 1200 is shown for activating and deactivating the designated modulated heating stage. As discussed above, the designated modulated heating stage can be one of the heating stages 21, 22, 23, 24 of the heating unit 20 or one of the heat pump stages 71, 72, 73, 74 of the heat pump unit 70 operating in a heating mode. Further, while the control algorithm 1200 is described as being performed by the HVAC control module 12, the control algorithm 1200 can likewise be executed by the system controller 60 in communication with the HVAC control module 12. As discussed above with reference to FIG. 11, when heating stage modulation is enabled, the HVAC control module 12 sets the highest order active heating stage as the modulated stage at step 1112. While the control algorithm 1200 is shown for "heating stage Z," when executed for a particular heating stage, for example, the appropriate setpoints corresponding to the particular heating stage are used. For example, when the control algorithm is executed for heating stage 1, the appropriate setpoints associated with cooling stage 1 are used. As such, the control algorithm 1200 can be executed for each of the particular heating stages in parallel.

The algorithm starts at 1202. At 1204, the HVAC control module 12 determines whether the particular heating stage is set as an active stage. When the heating stage is not set as an active stage, the HVAC control module 12 loops back to step 1204 and waits for the heating stage to be set as an active heating stage. At 1204, when the heating stage is set as an active stage, the HVAC control module 12 proceeds to 1206 and determines whether the heating stage is designated as the modulated stage. At 906, when the heating stage is not designated as the modulated stage, the HVAC control module 12 loops back to 1204 and waits for the heating stage to be designated both as an active heating stage and as the modulated stage.

At 1206, when the heating stage is both set as an active stage and designated as the modulated stage, the HVAC control module 12 proceeds to step 1208.

At 1208, the HVAC control module 12 receives the supply temperature as indicated by the supply air temperature sensor 52 mounted in the supply air flow of the HVAC unit 10, shown in FIGS. 1 and 5. While the control algorithm 900 is described with respect to use of the supply temperature as indicated by the supply air temperature sensor 52, other monitored or sensed temperatures of the HVAC unit 10, 10*a* or HVAC system 5, 5*a* can be alternatively used. For example, the return air temperature as indicated by the return air temperature sensor 50 mounted in the return air flow entering the HVAC unit 10 can alternatively be used. Additionally, the mixed air temperature as indicated by the mixed air temperature sensor 53 mounted in the mixed air flow can alternatively be used. Alternatively, the indoor space temperature as indicated by the indoor air temperature sensor 40 located within or near the indoor space 30 can alternatively be used. Depending on the specific temperature data used, appropriate setpoints, discussed below, can be used.

At 1210, the HVAC control module 12 determines whether the monitored supply temperature is greater than the off-temperature setpoint for the heating stage. Each heating stage has an associated off-temperature setpoint "Off-SP-HZ" and an associated on-temperature setpoint "On-SP-HZ" for use when the particular heating stage is designated as the modulated stage. As used and described herein, in the setpoint abbreviations "On-SP-HZ" and "Off-SP-HZ", the "Z" designates the particular heating stage number. For example, the off-temperature setpoint for heating stage 1 is abbreviated as Off-SP-H1 and the on-temperature setpoint for heating stage 1 is abbreviated as On-SP-H1. When the particular heating stage is set as the modulated stage, the HVAC control module 12 uses the appropriate off-temperature and on-temperature setpoints for the particular heating stage in performing the control algorithm 1200.

As an example, the on-temperature and off-temperature setpoints for heating stages 1 through 4 may be as shown in Table 4:

TABLE 4

Heating Modulation Setpoints for 4 Heating Stages

| stage no. (Z) | on-temp setpoint (On-SP-HZ) | off-temp setpoint (Off-SP-HZ) |
| --- | --- | --- |
| 1 | 70 degrees | 85 degrees |
| 2 | 85 degrees | 95 degrees |
| 3 | 95 degrees | 105 degrees |
| 4 | 105 degrees | 120 degrees |

In this example, the on-temperature setpoint for heating stage 1 is 70 degrees and the off-temperature setpoint for heating stage 1 is 85 degrees. The on-temperature setpoint for heating stage 2 is 85 degrees and the off-temperature setpoint for heating stage 2 is 95 degrees. The on-temperature setpoint for heating stage 3 is 95 degrees and the off-temperature setpoint for heating stage 3 is 105 degrees. The on-temperature setpoint for heating stage 4 is 105 degrees and the off-temperature setpoint for heating stage 4 is 120 degrees. As discussed above, the setpoints can be configured or modified by the user.

At 1210, the HVAC control module 12 determines whether the monitored supply temperature is greater than the off-temperature setpoint for the particular heating stage. At 1210, when the supply temperature is greater than the off-temperature setpoint for the particular heating stage, the HVAC control module proceeds to step 1212. At 1212, the HVAC control module determines the on-time for the particular heating stage "on-tm-HZ." The on-time for the particular heating stage corresponds to the elapsed time that the particular heating stage has been running. In other words, the on-time for the particular heating stage is the length of time since the particular heating stage was last activated, or turned on. The HVAC control module 12 then proceeds to step 1214.

At 1214, the HVAC control module 12 determines whether the on-time for the particular heating stage is greater than a minimum on-time threshold "min-on-tm-HZ." Each heating stage has an associated minimum run-time or on-time threshold, such that the heating stage cannot be deactivated before the minimum run-time or on-time has elapsed. For example, the minimum on-time may be 5 minutes. The minimum on-time thresholds may be the same for all heating stages or, alternatively, the minimum on-time thresholds may be different across the heating stages.

At 1214, when the on-time for the particular heating stage is greater than the associated minimum on-time threshold, the HVAC control module 12 proceeds to step 1216 and deactivates the particular heating stage. The HVAC control module 12 then loops back to step 1204. At 1214, when the on-time for the particular heating stage is not less than the minimum on-time threshold, the HVAC control module 12 loops back to step 1204 without deactivating the particular heating stage. In this way, the particular heating stage is not deactivated unless it has been on for the minimum on-time.

Referring back to step 1210, when the supply temperature is not greater than the off-temperature setpoint for the particular cooling stage, the HVAC control module 12 proceeds to step 1218.

At 1218, the HVAC control module 12 determines whether the supply temperature is less than the on-temperature setpoint for the particular heating stage. The on-temperature setpoint, for example, is described above with respect to Table 4. At 1218, when the supply temperature is not less than the on-temperature setpoint for the particular heating stage, the HVAC control module 12 loops back to step 1204.

At 1218, when the supply temperature is less than the on-temperature setpoint for the particular heating stage, the HVAC control module 12 proceeds to step 1220. At 1220, the HVAC control module 12 determines the off-time for the particular heating stage "off-tm-HZ." The off-time for the particular heating stage corresponds to the elapsed time that the particular heating stage has been turned off. In other words, the off-time for the particular heating stage is the length of time since the particular heating stage was last deactivated, or turned off. The HVAC control module 12 then proceeds to step 1222.

At 1222, the HVAC control module 12 determines whether the off-time for the particular heating stage is greater than a minimum off-time threshold "min-off-tm-HZ." Each heating stage has an associated minimum off-time threshold, such that the heating stage cannot be activated before the minimum off-time has elapsed. For example, the minimum off-time may be 2 minutes. The minimum off-time thresholds may be the same for all heating stages or, alternatively, the minimum off-time thresholds may be different across the heating stages.

At 1222, when the off-time for the particular heating stage is greater than the minimum off-time threshold, the HVAC control module 12 proceeds to step 1224 and reactivates the particular heating stage. The HVAC control module 12 then loops back to step 1204. At 1222, when the off-time for the particular heating stage is not less than the minimum off-time threshold, the HVAC control module 12 loops back to step 1204.

In this way, the HVAC control module 12 modulates the designated modulated stage on and off, in accordance with the on-temperature and off-temperature setpoints for the heating stage. By periodically deactivating the designated modulated stage, the HVAC system 5, 5a consumes less energy and operates with greater energy efficiency as compared with a similar HVAC system that operates without heating stage modulation. In this way, the described heating stage modulation control system and method provides for more energy efficient HVAC system operation.

With reference to FIG. 13, a control algorithm 1300 for modification of a value of a temperature or time setpoint for a particular heating or cooling phase is shown. For example, the control algorithm 1300 may be used to modify any of the various setpoints discussed above including the various on-temperature and off-temperature setpoints used during modulation of particular heating or cooling stages, e.g., On-SP-CX, Off-SP-CX, On-SP-HZ, and/or Off-SP-HZ. Further, the control algorithm 1300 may also be used to modify any of the various on-time and off-time setpoints used during modulation of particular heating or cooling stages, e.g., min-off-tm-CX, min-on-tm-CX, min-off-tm-HZ, and/or min-on-tm-HZ. Further, while the control algorithm 1300 is described as being performed by the HVAC control module 12, the control algorithm 1300 can likewise be executed by the system controller 60 in communication with the HVAC control module 12.

The control algorithm 1300 starts at 1302. At 1304, the HVAC control module 12 operates the HVAC unit 10, 10a with a set of original setpoint values over a first predetermined time period and monitors performance of the HVAC unit 10, 10a while operating with the original setpoint values. For example, the HVAC control module 12 may monitor energy consumption of the HVAC unit 10, 10a while operating with the original setpoint values. The first time period may be, for example, a day, a week, a month, or any other suitable evaluation time period. The HVAC control module 12 then proceeds to step 1306.

At 1306, the HVAC control module 12 modifies a value of a temperature setpoint (e.g., On-SP-CX, Off-SP-CX, On-SP-HZ, or Off-SP-HZ) or a value of a time setpoint (e.g., min-off-tm-CX, min-on-tm-CX, min-off-tm-HZ, or min-on-tm-HZ) for a particular heating or cooling phase. The HVAC control module 12 then proceeds to step 1308.

At 1308, the HVAC control module 12 may operate the HVAC unit 10, 10*a* with the modified setpoint value over a second predetermined time period of time and monitors performance of the HVAC unit 10, 10*a*. For example, the HVAC control module 12 may monitor energy consumption of the HVAC unit 10, 10*a* while operating with the modified setpoint value. The second time period may be, for example, a day, a week, a month, or any other suitable evaluation time period. Further, the second time period may be the same length of time or a different length of time than the first time period. The HVAC control module 12 then proceeds to step 1310.

At 1310, the HVAC control module 12 may evaluate the performance of the HVAC unit 10, 10*a* with the original setpoint value over the first time period as compared with the performance of the HVAC unit 10, 10*a* with the modified setpoint value over the second time period. For example, the HVAC control module 12 may compare a total amount of energy consumption over the first time period with a total amount of energy consumption over the second time period. Additionally, the HVAC control module 12 may compare a rate of energy consumption over the first time period with a rate of energy consumption over the second time period. The HVAC control module 12 may then proceed to step 1312.

At 1312, the HVAC control module 12 may determine whether to further modify the particular temperature or time setpoint value based on the evaluation and comparison in step 1310. For example, if the modification to the setpoint value improved performance of the HVAC unit 10, 10*a* by reducing energy consumption, the HVAC control module 12 may determine to further modify the same setpoint value in the same direction again to further evaluate performance. For example, if an increase in a time or temperature setpoint value resulted in reduced energy consumption, the HVAC control module 12 may further increase the time or temperature setpoint value. If, on the other hand, the modification to the setpoint value did not improve performance and resulted in increased energy consumption, the HVAC control module 12 may further modify the particular setpoint value by changing it back to the original setpoint value, or by modifying the setpoint value in the opposite direction. For example, if the setpoint value was originally increased and, as a result, energy consumption increased, the HVAC control module 12 may then decrease the setpoint value from the original value to evaluate performance. If modification of the particular setpoint value in both directions results in a decrease in performance, then the HVAC control module 12 may return to the original setpoint value without further modification.

At step 1314, the HVAC control module 12 determine whether further modification of the particular setpoint should be made, based on the evaluation and comparison of performance. At 1314, when additional modification of the setpoint value is needed, the HVAC control module 12 loops back to step 1304. On the subsequent iteration of the control algorithm 1300, however, the previously modified setpoint value becomes the original setpoint value for purposes of the next modification and comparison. At 1314, when no further modification of the setpoint value is needed, the control algorithm 1300 ends at 1316.

In this way, the HVAC control module 12 may learn optimized and most energy efficient values of the various temperature and time setpoints to be used for the heating and cooling modulation system and method described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

For purposes of clarity, the same reference numbers are used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently), as appropriate, without altering the principles of the present disclosure.

As used herein, the term module may refer to, be part of, or include: an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first stage, element, component, region, layer or section discussed below could be termed a second stage, element, component, region, layer or section without departing from the teachings of the example embodiments.

What is claimed is:

1. A method comprising:
    determining, with an HVAC control module of an HVAC unit having a first cooling stage and at least one additional cooling stage, a need for cooling of a space to be cooled based on a comparison of an indoor temperature of the space to be cooled with an indoor temperature setpoint;
    activating, with the HVAC control module, the first cooling stage and the at least one additional cooling stage of the HVAC unit based on the determined need for cooling;
    monitoring, with the HVAC control module, a monitored temperature of the HVAC unit corresponding to one of a supply air temperature of air exiting the HVAC unit and a return air temperature of air entering the HVAC unit;
    monitoring, with the HVAC control module, an on-time of the first cooling stage, the on-time being a time elapsed since activation of the first cooling stage;
    comparing, with the HVAC control module, the monitored temperature with an off-temperature setpoint and the monitored on-time with a minimum on-time period setpoint;
    deactivating, with the HVAC control module, the first cooling stage when the monitored temperature is less than the off-temperature setpoint and the monitored on-time is greater than the minimum on-time period setpoint;
    monitoring, with the HVAC control module, an off-time of the first cooling stage, the off-time being a time elapsed since deactivation of the first cooling stage;
    comparing, with the HVAC control module, the monitored temperature with an on-temperature setpoint, the on-temperature setpoint being greater than the off-temperature setpoint;
    comparing, with the HVAC control module, the monitored off-time with a minimum off-time period setpoint;
    reactivating, with the HVAC control module, the first cooling stage when the monitored temperature is greater than the on-temperature setpoint and the monitored off-time is greater than the minimum off-time period setpoint;
    operating the at least one additional cooling stage throughout when the first cooling stage is activated, deactivated, and reactivated; and
    modifying, with the HVAC control module, at least one of the off-temperature setpoint, the on-temperature setpoint, the minimum on-time period setpoint, and the minimum off-time period setpoint;
    evaluating performance of the HVAC unit, with the HVAC control module, after modification of the at least one of the off-temperature setpoint, the on-temperature setpoint, the minimum on-time period setpoint, and the minimum off-time period setpoint; and
    determining, with the HVAC control module, whether to further modify the at least one of the off-temperature setpoint, the on-temperature setpoint, the minimum on-time period setpoint, and the minimum off-time period setpoint based on the evaluation;
    wherein the at least one additional cooling stage has corresponding on-temperature and off-temperature setpoints that are different from the respective on-temperature and off-temperature setpoints of the first cooling stage.

2. The method of claim 1, wherein the monitored temperature corresponds to the supply air temperature of air exiting the HVAC unit.

3. The method of claim 1, further comprising:
    receiving, with the HVAC control module, user input modifying at least one of the off-temperature setpoint, the on-temperature setpoint, the minimum on-time period setpoint, and the minimum off-time period setpoint.

4. The method of claim 1, wherein the HVAC unit includes a heat pump unit and the first cooling stage is a heat pump stage of the heat pump unit operated in a cooling mode.

5. The method of claim 1, further comprising:
    monitoring the indoor temperature of the space to be cooled with the HVAC control module; and
    comparing, with the HVAC control module, the indoor temperature with the indoor temperature setpoint.

6. The method of claim 5, further comprising:
determining, with the HVAC control module, an amount of cooling capacity required based on the comparison of the indoor temperature with the indoor temperature setpoint;
wherein the determining the need for cooling is based on the amount of cooling capacity required and wherein the activating the first cooling stage based on the determined need for cooling is based on the amount of cooling capacity required.

7. The method of claim 1, wherein determining the need for cooling of the space to be cooled includes receiving, with the HVAC control module, a request for cooling the space to be cooled.

8. The method of claim 7, wherein receiving the request for cooling the space to be cooled includes receiving the request for cooling from a system controller in communication with the HVAC control module.

9. A method comprising:
determining, with an HVAC control module of an HVAC unit having a first heating stage and at least one additional heating stage, a need for heating of a space to be heated based on a comparison of an indoor temperature of the space to be heated with an indoor temperature setpoint;
activating, with the HVAC control module, the first heating stage and the at least one additional heating stage of the HVAC unit based on the determined need for heating;
monitoring, with the HVAC control module, a monitored temperature of the HVAC unit corresponding to one of a supply air temperature of air exiting the HVAC unit and a return air temperature of air entering the HVAC unit;
monitoring, with the HVAC control module, an on-time of the first heating stage, the on-time being a time elapsed since activation of the first heating stage;
comparing, with the HVAC control module, the monitored temperature with an off-temperature setpoint and the monitored on-time with a minimum on-time period setpoint;
deactivating, with the HVAC control module, the first heating stage when the monitored temperature is greater than the off-temperature setpoint and the monitored on-time is greater than the minimum on-time period setpoint;
monitoring, with the HVAC control module, an off-time of the first heating stage, the off-time being a time elapsed since deactivation of the first heating stage;
comparing, with the HVAC control module, the monitored temperature with an on-temperature setpoint, the on-temperature setpoint being less than the off-temperature setpoint;
comparing, with the HVAC control module, the monitored off-time with a minimum off-time period setpoint;
reactivating, with the HVAC control module, the first heating stage when the monitored temperature is less than the on-temperature setpoint and the monitored off-time is greater than the minimum off-time period setpoint;
operating the at least one additional heating stage throughout when the first heating stage is activated, deactivated, and reactivated;
modifying, with the HVAC control module, at least one of the off-temperature setpoint, the on-temperature setpoint, the minimum on-time period setpoint, and the minimum off-time period setpoint;
evaluating performance of the HVAC unit, with the HVAC control module, after modification of the at least one of the off-temperature setpoint, the on-temperature setpoint, the minimum on-time period setpoint, and the minimum off-time period setpoint; and
determining, with the HVAC control module, whether to further modify the at least one of the off-temperature setpoint, the on-temperature setpoint, the minimum on-time period setpoint, and the minimum off-time period setpoint based on the evaluation;
wherein the at least one additional heating stage has corresponding on-temperature and off-temperature setpoints that are different from the respective on-temperature and off-temperature setpoints of the first heating stage.

10. The method of claim 9, wherein the monitored temperature corresponds to the supply air temperature of air exiting the HVAC unit.

11. The method of claim 9, further comprising:
receiving, with the HVAC control module, user input modifying at least one of the off-temperature setpoint, the on-temperature setpoint, the minimum on-time period setpoint, and the minimum off-time period setpoint.

12. The method of claim 9, wherein the HVAC unit includes a heat pump unit and the first heating stage is a heat pump stage of the heat pump unit operated in a heating mode.

13. The method of claim 9, further comprising:
monitoring the indoor temperature of the space to be heated with the HVAC control module; and
comparing, with the HVAC control module, the indoor temperature with the indoor temperature setpoint.

14. The method of claim 13, further comprising:
determining, with the HVAC control module, an amount of heating capacity required based on the comparison of the indoor temperature with the indoor temperature setpoint;
wherein the determining the need for heating is based on the amount of heating capacity required and wherein the activating the first heating stage based on the determined need for heating is based on the amount of heating capacity required.

15. The method of claim 9, wherein determining the need for heating of the space to be heating includes receiving, with the HVAC control module, a request for heating the space to be heated.

16. The method of claim 15, wherein receiving the request for heating the space to be heated includes receiving the request for heating from a system controller in communication with the HVAC control module.

17. A system comprising:
a controller for an HVAC unit having a first cooling stage and at least one additional cooling stage, the controller including a processor and a non-transitory computer readable storage medium, the non-transitory computer readable storage medium storing instructions, executable by the processor, for:
determining a need for cooling of a space to be cooled based on a comparison of an indoor temperature of the space to be cooled with an indoor temperature setpoint;
activating the first cooling stage and the at least one additional cooling stage of the HVAC unit based on the determined need for cooling;
monitoring a monitored temperature of the HVAC unit corresponding to one of a supply air temperature of air exiting the HVAC unit and a return air temperature of air entering the HVAC unit;

monitoring an on-time of the first cooling stage, the on-time being a time elapsed since activation of the first cooling stage;

comparing the monitored temperature with an off-temperature setpoint and the monitored on-time with a minimum on-time period setpoint;

deactivating the first cooling stage when the monitored temperature is less than the off-temperature setpoint and the monitored on-time is greater than the minimum on-time period setpoint;

monitoring an off-time of the first cooling stage, the off-time being a time elapsed since deactivation of the first cooling stage;

comparing the monitored temperature with an on-temperature setpoint, the on-temperature setpoint being greater than the off-temperature setpoint;

comparing the monitored off-time with a minimum off-time period setpoint;

reactivating the first cooling stage when the monitored temperature is greater than the on-temperature setpoint and the monitored off-time is greater than the minimum off-time period setpoint;

operating the at least one additional cooling stage throughout when the first cooling stage is activated, deactivated, and reactivated;

modifying at least one of the off-temperature setpoint, the on-temperature setpoint, the minimum on-time period setpoint, and the minimum off-time period setpoint;

evaluating performance of the HVAC unit after modification of the at least one of the off-temperature setpoint, the on-temperature setpoint, the minimum on-time period setpoint, and the minimum off-time period setpoint; and determining whether to further modify the at least one of the off-temperature setpoint, the on-temperature setpoint, the minimum on-time period setpoint, and the minimum off-time period setpoint based on the evaluation;

wherein the at least one additional cooling stage has corresponding on-temperature and off-temperature setpoints that are different from the respective on-temperature and off-temperature setpoints of the first cooling stage.

18. The system of claim 17, wherein the monitored temperature corresponds to the supply air temperature of air exiting the HVAC unit.

19. The system of claim 17, the non-transitory computer readable storage medium storing further instructions, executable by the processor, for:
receiving user input modifying at least one of the off-temperature setpoint, the on-temperature setpoint, the minimum on-time period setpoint, and the minimum off-time period setpoint.

20. The system of claim 17, wherein the HVAC unit includes a heat pump unit and the first cooling stage is a heat pump stage of the heat pump unit operated in a cooling mode.

21. The system of claim 17, the non-transitory computer readable storage medium storing further instructions, executable by the processor, for:
monitoring the indoor temperature of the space to be cooled; and
comparing the indoor temperature with indoor temperature setpoint.

22. The system of claim 21, the non-transitory computer readable storage medium storing further instructions, executable by the processor, for:
determining an amount of cooling capacity required based on the comparison of the indoor temperature with the indoor temperature setpoint;
wherein the determining the need for cooling is based on the amount of cooling capacity required and wherein the activating the first cooling stage based on the determined need for cooling is based on the amount of cooling capacity required.

23. The system of claim 17, wherein determining the need for cooling the space to be cooled includes receiving a request for cooling of the space to be cooled.

24. The system of claim 23, wherein receiving the request for cooling the space to be cooled includes receiving the request for cooling from a system controller in communication with the controller for the HVAC unit.

25. A system comprising:
a controller for an HVAC unit having a first heating stage and at least one additional heating stage, the controller including a processor and a non-transitory computer readable storage medium, the non-transitory computer readable storage medium storing instructions, executable by the processor, for:
determining a need for heating a space to be heated based on a comparison of an indoor temperature of the space to be heated with an indoor temperature setpoint;
activating the first heating stage and the at least one additional heating stage of the HVAC unit based on the determined need for heating;
monitoring a monitored temperature of the HVAC unit corresponding to one of a supply air temperature of air exiting the HVAC unit and a return air temperature of air entering the HVAC unit;
monitoring an on-time of the first heating stage, the on-time being a time elapsed since activation of the first heating stage;
comparing the monitored temperature with an off-temperature setpoint and the monitored on-time with a minimum on-time period setpoint;
deactivating the first heating stage when the monitored temperature is greater than the off-temperature setpoint and the monitored on-time is greater than the minimum on-time period setpoint;
monitoring an off-time of the first heating stage, the off-time being a time elapsed since deactivation of the first heating stage;
comparing the monitored temperature with an on-temperature setpoint, the on-temperature setpoint being less than the off-temperature setpoint;
comparing the monitored off-time with a minimum off-time period setpoint;
reactivating the first heating stage when the monitored temperature is less than the on-temperature setpoint and the monitored off-time is greater than the minimum off-time period setpoint;
operating the at least one additional heating stage throughout when the first heating stage is activated, deactivated, and reactivated;
modifying at least one of the off-temperature setpoint, the on-temperature setpoint, the minimum on-time period setpoint, and the minimum off-time period setpoint;
evaluating performance of the HVAC unit after modification of the at least one of the off-temperature setpoint, the on-temperature setpoint, the minimum on-time period setpoint, and the minimum off-time period setpoint; and determining whether to further modify the at least one of the off-temperature setpoint, the on-temperature setpoint, the minimum on-time period setpoint, and the minimum off-time period setpoint based on the evaluation;

wherein the at least one additional heating stage has corresponding on-temperature and off-temperature setpoints that are different from the respective on-temperature and off-temperature setpoints of the first heating stage.

26. The system of claim 25, wherein the monitored temperature corresponds to the supply air temperature of air exiting the HVAC unit.

27. The system of claim 25, the non-transitory computer readable storage medium storing further instructions, executable by the processor, for:

receiving user input modifying at least one of the off-temperature setpoint, the on-temperature setpoint, the minimum on-time period setpoint, and the minimum off-time period setpoint.

28. The system of claim 25, wherein the HVAC unit includes a heat pump unit and the first heating stage is a heat pump stage of the heat pump unit operated in a heating mode.

29. The system of claim 25, the non-transitory computer readable storage medium storing further instructions, executable by the processor, for:

monitoring the indoor temperature of the space to be heated; and comparing the indoor temperature with the indoor temperature setpoint.

30. The system of claim 29, the non-transitory computer readable storage medium storing further instructions, executable by the processor, for:

determining an amount of heating capacity required based on the comparison of the indoor temperature with the indoor temperature setpoint;

wherein the determining the need for heating is based on the amount of heating capacity required and wherein the activating the first heating stage based on the determined need for heating is based on the amount of heating capacity required.

31. The system of claim 25, wherein determining the need for heating of the space to be heated includes receiving a request for heating the space to be heated.

32. The system of claim 31, wherein receiving the request for heating the space to be heated includes receiving the request for heating from a system controller in communication with the controller for the HVAC unit.

* * * * *